United States Patent
Dien

(10) Patent No.: US 9,318,900 B2
(45) Date of Patent: Apr. 19, 2016

(54) POWER MANAGEMENT SYSTEM

(71) Applicant: Ghing-Hsin Dien, Taipei (TW)

(72) Inventor: Ghing-Hsin Dien, Taipei (TW)

( * ) Notice: Subject to any disclaimer, the term of this patent is extended or adjusted under 35 U.S.C. 154(b) by 692 days.

(21) Appl. No.: 13/653,978

(22) Filed: Oct. 17, 2012

(65) Prior Publication Data

US 2013/0093396 A1   Apr. 18, 2013

(30) Foreign Application Priority Data

Oct. 18, 2011 (TW) .............................. 100137794 A

(51) Int. Cl.
*H02J 7/00* (2006.01)
*H02M 7/483* (2007.01)

(52) U.S. Cl.
CPC ............. *H02J 7/0013* (2013.01); *H02M 7/483* (2013.01)

(58) Field of Classification Search
USPC ........................................................ 320/118
See application file for complete search history.

(56) References Cited

U.S. PATENT DOCUMENTS

| 5,453,643 | A  | * | 9/1995  | Yang ................................ 307/71 |
| 6,184,726 | B1 | * | 2/2001  | Haeberli et al. ................. 327/96 |
| 8,552,788 | B2 | * | 10/2013 | Ivanov ............................ 327/333 |
| 2005/0023054 | A1 |   | 2/2005  | Weidenheimer et al. |
| 2011/0115436 | A1 | * | 5/2011  | Zhang et al. .................. 320/134 |

FOREIGN PATENT DOCUMENTS

JP          07-046850          2/1995

* cited by examiner

*Primary Examiner* — Yalkew Fantu
(74) *Attorney, Agent, or Firm* — Muncy, Gessler, Olds & Lowe, P.C.

(57) ABSTRACT

A power management system capable of outputting AC voltages includes a plurality of power units, at least a first diode, a first polarity switch unit and a control unit. The power units are electrically connected to form a power unit string. Each power unit includes a battery module and a first switch device connected in serial. One end of the first diode is connected to one of the power units, and the other end thereof is connected to a first common node to form a discharge path. The first polarity switch unit is electrically connected to the first common node and the power unit string, and outputs a first operating voltage. The control unit is electrically connected to the first switch device and the first polarity switch unit to turn on/off the first switch device and control the output polarity of the first polarity switch unit.

14 Claims, 39 Drawing Sheets

|         | t0  | t1  | t2  | t3  | t4  | t5  | t6  | t7  | t8  | t9  | ta  | tb  |
|---------|-----|-----|-----|-----|-----|-----|-----|-----|-----|-----|-----|-----|
| SW3(U1) | off | on  | on  | on  | on  | on  | off | on  | on  | on  | on  | on  |
| SW3(U2) | on  | off | on  | on  | on  | off | on  | off | on  | on  | on  | off |
| SW3(U3) | off | off | off | off | off | off | off | off | off | off | on  | off |
| SW3(U4) | off | on  | off | off | on  | on  | off | on  | off | on  | off | on  |
| SW3(U5) | on  | on  | on  | off | off | off | on  | on  | off | off | on  | on  |
| SW3(U6) | on  | on  | on  | on  | off | on  | on  | on  | on  | on  | off | off |
| SW1(U1) | off | on  | on  | on  | on  | on  | off | on  | on  | on  | on  | on  |
| SW1(U2) | on  | off | on  | on  | on  | off | on  | off | on  | on  | on  | off |
| SW1(U3) | on  | on  | off | on  | off | on  | off | on  | off | on  | off | on  |
| SW1(U4) | off | on  | off | off | on  | on  | on  | on  | on  | off | on  | on  |
| SW1(U5) | on  | on  | on  | on  | off | on  | on  | on  | on  | on  | off | off |
| SW1(U6) | on  | on  | on  | off | off | off | on  | on  | off | off | on  | on  |
| SW2(U2) | off | off | off | off | off | off | off | off | off | off | off | off |
| SW2(U3) | on  | on  | off | on  | off | on  | off | off | off | off | off | off |
| SW2(U4) | off | off | off | off | off | off | off | off | off | on  | off | off |
| SW2(U5) | off | off | off | off | on  | on  | off | off | off | off | on  | on  |

FIG. 12A

|  | t0 | t1 | t2 | t3 | t4 | t5 | t6 | t7 | t8 | t9 | ta | tb |
|---|---|---|---|---|---|---|---|---|---|---|---|---|
| V1 | 0 | 1 | 2 | 3 | 2 | 1 | 0 | -1 | -2 | -3 | -2 | -1 |
| V2 | -2 | -3 | -2 | -1 | 0 | 1 | 2 | 3 | 2 | 1 | 0 | -1 |
| V3 | 2 | 1 | 0 | -1 | -2 | -3 | -2 | -1 | 0 | 1 | 2 | 3 |

POWER MANAGEMENT SYSTEM

CROSS REFERENCE TO RELATED APPLICATIONS

This Non-provisional application claims priority under 35 U.S.C. §119(a) on Patent Application No(s). 100137794 filed in Taiwan, Republic of China on Oct. 18, 2011, the entire contents of which are hereby incorporated by reference.

BACKGROUND OF THE INVENTION

1. Field of Invention

The invention relates to a power management system.

2. Related Art

The biggest problem caused by the vehicles or generators using the fossil fuel, such as gasoline or diesel fuel, is to produce the air pollution. Thus, with the rising environmental awareness, utilizing the battery as the power source for the vehicles or generators to have a lower pollution has become a major development direction in the industry. The vehicles and the other large-scale machines require higher voltage and current during operation, and are mostly driven by Alternating-Current (AC) power sources or even a multi-phase AC power source. So, when using the battery as the power supply unit, multiple batteries are usually connected in series and/or parallel to increase the output voltage and/or current of the power supply unit, and the power supply output are converted into an AC power or even a multi-phase AC power.

Due to the characteristics of the battery, such as the residual capacity and the like, the matching conditions of the batteries must be considered when multiple batteries are serially connected for operation. If the batteries are serially connected when in charging, the batteries with higher residual capacities could be damaged by overcharging, and the batteries with lower residual capacities will probably be not fully charged. During the discharging operation, a battery could be damaged by over-discharging due to the differences of the characteristics and the different residual capacities between the batteries.

Therefore, it is an important subject to provide a power management system which can adjust the connection configuration of the power units in accordance with the requirements of the charging voltage, the desired output voltage, or the state of each battery module, so that the power units can be charged with an AC power, or can output an AC power or a multi-phase AC power, and can be effectively protected and/or balanced during charging/discharging, and avoid from being damaged.

SUMMARY OF THE INVENTION

In view of the foregoing subject, an objective of the invention is to provide a power management system capable of effectively protecting the power units, minimizing power loss, and adjusting the connection configuration of the power units in accordance with the requirements of the charging voltage or the desired output voltage or the state of each battery module.

To achieve the above objective, the present invention discloses a power management system including a plurality of power units, at least a first diode, a control unit and a first polarity switch unit. The power units are electrically connected to form a power unit string. Each power unit includes a battery module and a first switch device connected in serial to form a serial module. One end of the first diode is connected to one of the power units, and the other end thereof is connected to a first common node to form a discharge path. The control unit is electrically connected to the first switch devices, and outputs a first switch signal to each of the first switch devices in accordance with a control signal individually. The first polarity switch unit is electrically connected to the first common node and the power unit string, and outputs a first operating voltage. The control unit outputs a first adjusting signal to the first polarity switch unit to control the polarity of the first operating voltage and to make the first operating voltage become an AC voltage.

To achieve the above objective, the present invention also discloses a power management system including a plurality of power units, at least a second switch device, at least a third switch device, a first polarity switch unit, a second polarity switch unit, and a control unit. The power units are electrically connected to form a power unit string. Each of the power units comprises a battery module and a first switch device, and the battery module and the first switch device are serially connected to form a serial module. One end of the second switch device is electrically connected to one of the power units, and the other end thereof is connected to a first common node to form a discharge path. One end of the third switch device is electrically connected to one of the power units, and the other end thereof is connected to a second common node to form another discharge path. The first polarity switch unit is electrically connected to the power unit string and the first common node, and outputs a first operating voltage. The second polarity switch unit is electrically connected to the power unit string and the second common node, and outputs a second operating voltage. The control unit is electrically connected to the first switch devices, the second switch devices, the third switch devices, the first polarity switch unit, and the second polarity switch unit. The control unit individually outputs a first switch signal to each of the first switch devices in accordance with a control signal, and individually controls each of the first switch devices to turn on or off. The control unit individually outputs a second switch signal to each of the second switch devices in accordance with the control signal, and individually controls each of the second switch devices to turn on or off to control a discharge voltage on the first common node. The control unit individually outputs a third switch signal to each of the third switch devices in accordance with the control signal, and individually controls each of the third switch devices to turn on or off to control a discharge voltage on the second common node. The control unit outputs a first adjusting signal to the first polarity switch unit to control a polarity of the first operating voltage, and outputs a second adjusting signal to the second polarity switch unit to control a polarity of the second operating voltage.

As mentioned above, the power management system in accordance with the invention utilizes the control unit to output a first switch signal to the first switch device to control the first switch device to turn on or off, and to control the first polarity switch unit to adjust the polarity of the first operating voltage, thereby making the first operating voltage become an AC voltage. In addition, the connection to additional switch devices or diodes makes the power management system not only to provide the discharge function, but also provide the functions of charging, protection for power units, or multi-phase outputs, thereby minimizing the power loss, and adjusting the connection configuration of the power units in accordance with the charging voltage, the desired output voltage, or the state of each battery module.

BRIEF DESCRIPTION OF THE DRAWINGS

The invention will become more fully understood from the detailed description and accompanying drawings, which are given for illustration only, and thus are not limitative of the present invention, and wherein:

FIG. 12A is a schematic illustration showing combinations of states of the switch devices;

DETAILED DESCRIPTION OF THE INVENTION

The present invention will be apparent from the following detailed description, which proceeds with reference to the accompanying drawings, wherein the same references relate to the same elements.

Figure 1:
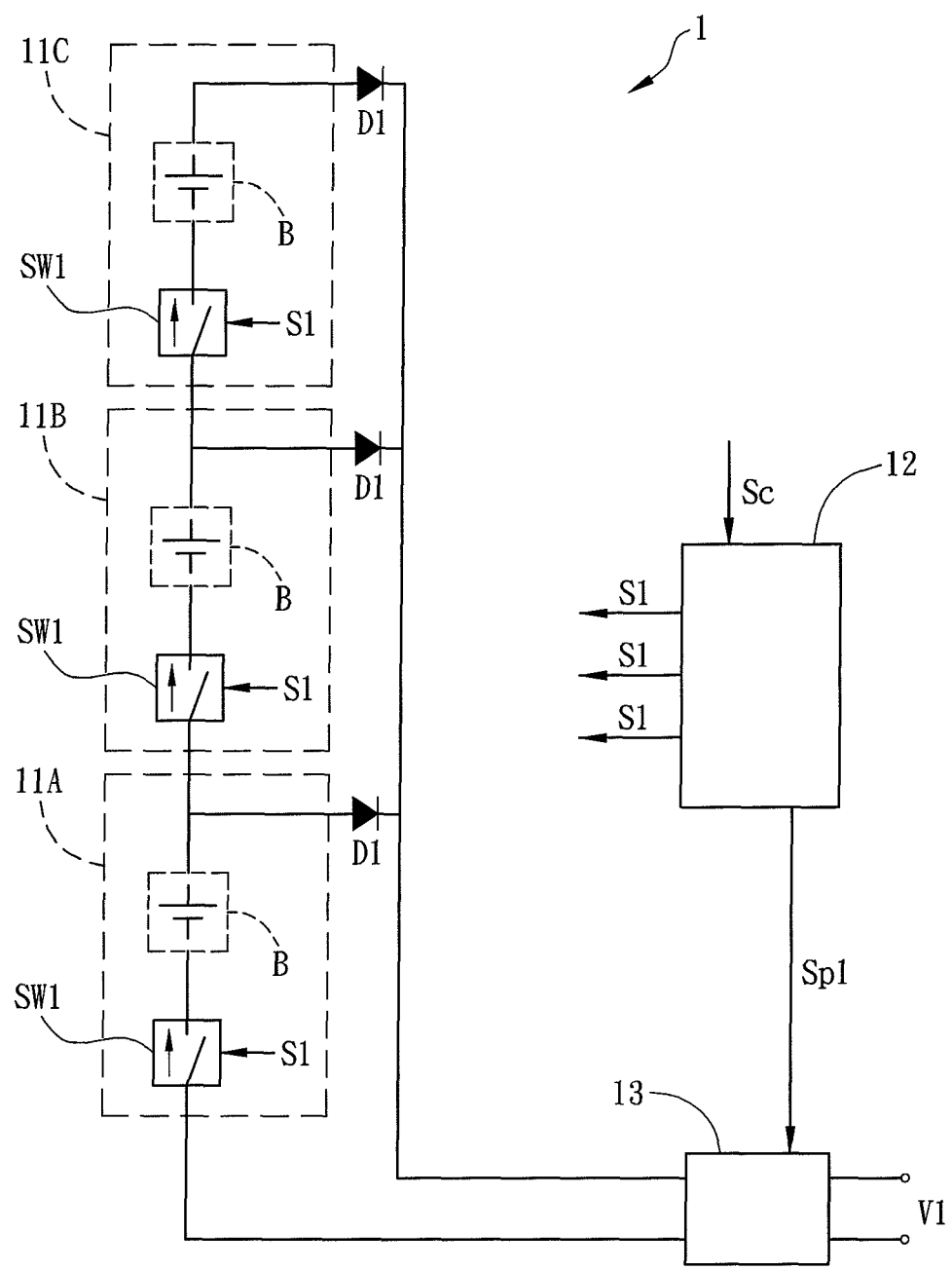
FIG. 1 is a schematic illustration showing a power management system according to a preferred embodiment of the invention.

FIG. 1 is a schematic illustration showing a power management system according to a preferred embodiment of the invention. Referring to FIG. 1, a power management system 1 includes a plurality of power units 11A to 11C, at least a diode D1, a control unit 12 and a first polarity switch unit 13. The power management system 1 of FIG. 1 includes three diodes D1; however, in other embodiments, the power management system may include one, two or more power units which is not limited.

Each of the power units 11A to 11C includes a battery module B and a first switch device SW1. The battery module B and the first switch device SW1 are serially connected to form a serial module. The power units 11A to 11C are serially connected to form a power unit string. One end of the first diode D1 is electrically connected to one of the power units 11A to 11C, and the other end thereof is connected to a first common node. In this embodiment, the cathodes of the first diodes D1 are electrically connected together and coupled to the first common node.

In the implementation, the battery module B may include a secondary battery, an electric double-layer capacitor, a chargeable/dischargeable element or a combined element. In addition, the battery module B may also include a photovoltaic cell or a fuel cell. In other words, each battery module B may include one or multiple chargeable/dischargeable elements or combined elements, wherein the number of the contained chargeable/dischargeable elements or combined elements is not particularly restricted in this invention.

The control unit 12 is electrically connected to the first switch devices SW1 of the power units 11A to 11C, individually outputs a first switch signal S1 to each first switch device SW1 in accordance with a control signal Sc, and individually controls each first switch device SW1 to turn on or off. The control signal Sc may be a state signal, a communication signal, an order signal, a feedback signal or an arbitrary combination of the above-mentioned signals. For example, the state signal represents the electric power state of each battery module B, the feedback signal represents the voltage value of the output voltage of each battery module B, a signal representing the voltage value on the first common node, a signal representing the voltage value of a first operating voltage V1, a signal transmitted from another controller, or the like.

The first polarity switch unit 13 is electrically connected to the power unit string and the control unit 12. In more specific, the first polarity switch unit 13 is connected to one end of the power unit string. The first polarity switch unit 13 also outputs the first operating voltage V1, and receives a first adjusting signal Sp1 which is outputted from the control unit 12, to adjust the polarity of the first operating voltage so that the outputted first operating voltage V1 becomes an AC voltage.

In this example embodiment, three power units 11A to 11C are illustrated, wherein each battery module B has the output voltage of 1.5 volts. In practice, however, the number of the power units can be adjusted. In addition, for the sake of illustration, the power units 11A to 11C in FIG. 1 from bottom to top will be referred to as a first-stage power unit, a second-stage power unit and a third-stage power unit, respectively. However, it is to be noted that the top and bottom directions are made with respect to the corresponding positions of FIG. 1, but do not intend to restrict the invention.

Figure 2:
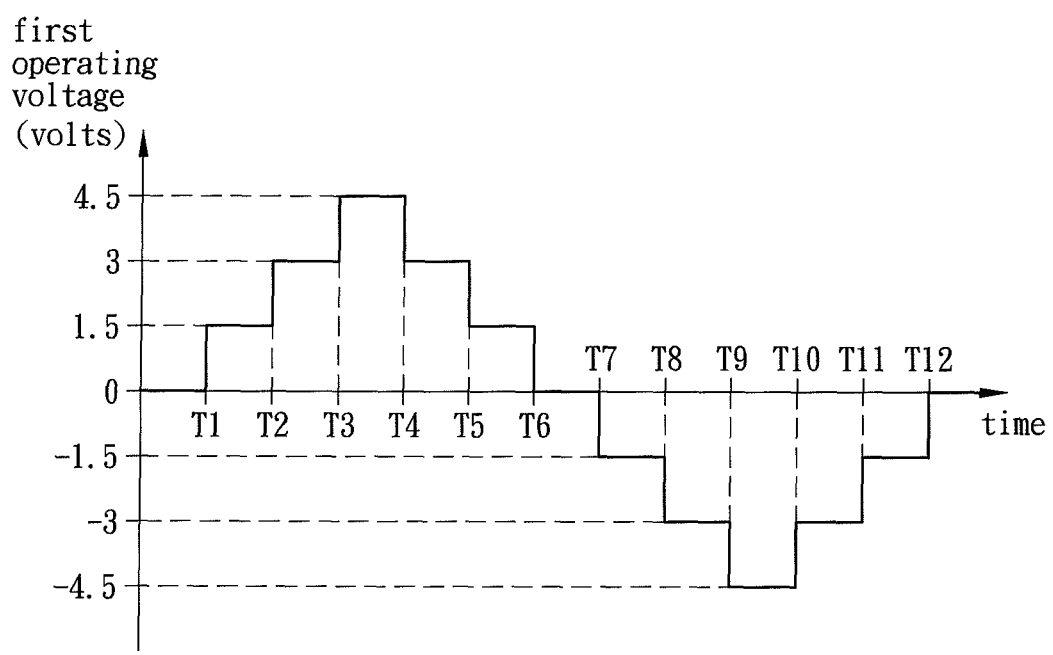
FIG. 2 is a schematic illustration showing a waveform of a first operating voltage.

The operation of the power management system 1 will be further described with reference to FIG. 2 in view of FIG. 1. FIG. 2 is a schematic illustration showing a waveform of the first operating voltage V1 outputted by the power management system 1.

When the time is between 0 and T1, a first switch control signal S1 outputted from the control unit 12 individually controls the first switch device SW1 of the first-stage power unit 11A, the first switch device SW1 of the second-stage power unit 11B and the first switch device SW1 of the third-stage power unit 11C to turn off, so that no power unit is discharged in this time interval, and the voltage value of the first operating voltage V1 in this time period is zero volt.

When the time is between T1 and T2: the first switch control signal S1 outputted from the control unit 12 individually controls the first switch device SW1 of the first-stage power unit 11A to turn on, and controls the first switch device SW1 of the second-stage power unit 11B and the first switch device SW1 of the third-stage power unit 11C to turn off, so that only the first-stage power unit 11A is discharged in this time interval. The control unit 12 also outputs the first adjusting signal Sp1 to control the first polarity switch unit 13 to output the first operating voltage V1 with the positive polarity, so that the voltage value of the first operating voltage V1 in this time period is 1.5 volts.

When the time is between T2 and T3: the first switch signal S1 outputted from the control unit 12 individually controls the first switch device SW1 of the first-stage power unit 11A and the first switch device SW1 of the second-stage power unit 11B to turn on and controls the first switch device SW1 of the third-stage power unit 11C to turn off, so that the battery module B of the first-stage power unit 11A and the second-stage power unit 11B are concurrently discharged in this time interval. The control unit 12 also outputs the first adjusting signal Sp1 to control the first polarity switch unit 13 to output the first operating voltage V1 with the positive polarity, so that the voltage value of the first operating voltage V1 in this time period is 3 volts.

When the time is between T3 and T4, the first switch signal S1 outputted from the control unit 12 individually controls the first switch device SW1 of the first-stage power unit 11A, the first switch device SW1 of the second-stage power unit 11B and the first switch device SW1 of the third-stage power unit 11C to turn on, so that the first-stage power unit 11A, the second-stage power unit 11B and the third-stage power unit 11C in this time interval are discharged. The control unit 12 also outputs the first adjusting signal Sp1 to control the first polarity switch unit 13 to output the first operating voltage V1 with the positive polarity, so that the voltage value of the first operating voltage V1 in this time period is 4.5 volts.

When the time is between T4 and T5, the working condition of each switch device is the same as that when the time is between T2 and T3. When the time is between T5 and T6, the working condition of each switch device is the same as that when the time is between T1 and T2. When the time is between T6 and T7, the working condition of each switch device is the same as that when the time is between 0 and T1. Illustrations can be found hereinabove, so detailed descriptions thereof are omitted.

When the time is between T7 and T8, the condition is the substantially same as that when the time is between T1 and T2 except that the control unit 12 outputs the first adjusting signal Sp1 to control the first polarity switch unit 13 to output the first operating voltage V1 with the negative polarity, so that the voltage value of the first operating voltage V1 in this time period is −1.5 volts, wherein the other portions are the same and may be found hereinabove, and detailed descriptions thereof are omitted. It is to be noted that the control unit 12 determines the polarity of the first operating voltage V1 to be positive or negative in accordance with a switch device state table, for example, and thus outputs the first adjusting signal Sp1 to the first polarity switch unit 13. Of course, the control unit 12 may also obtain the voltage waveform on the output end by detecting the voltage value of the first operating voltage V1, change the first switch signal S1 and the first adjusting signal Sp1 according to the requirement, and adjust the output voltage of the first polarity switch unit 13 and switch it from positive to negative or from negative to positive.

When the time is between T8 and T9, the condition is substantially the same as that when the time is between T2 and T3 except that the control unit 12 outputs the first adjusting signal Sp1 to control the first polarity switch unit 13 to output the first operating voltage V1 with the negative polarity, so that the voltage value of the first operating voltage V1 in this time period is −3 volts. Herein, the other portions are the same and may be found hereinabove, and detailed descriptions thereof are omitted.

When the time is between T9 and T10, the condition is substantially the same as that when the time is between T3 and T4 except that the control unit 12 outputs the first adjusting signal Sp1 to control the first polarity switch unit 13 to output the first operating voltage V1 with the negative polarity, so that the voltage value of the first operating voltage V1 in this time period is −4.5 volts. Herein, the other portions are the same and may be found hereinabove, and detailed descriptions thereof are omitted.

When the time is between T10 and T11, the working condition of each switch device is the same as that when the time is between T8 and T9. When the time is between T11 and T12, the working condition of each switch device is the same as that when the time is between T7 and T8. Illustrations can be found hereinabove, so detailed descriptions thereof are omitted.

Briefly, in the power management system 1, the control unit 12 controls the number of the power units to discharge, and controls the first polarity switch unit 13 to adjust the polarity of the outputted first operating voltage V1 to make the first operating voltage V1 become an AC voltage, which is provided to a load (not shown) as an AC power source.

It is to be particularly noted that the waveform chart is only for the illustrative purpose, and the power management system 1 is not restricted to output exactly the same waveform. In practice, the time for each of the stages of the power units 11A to 11C to discharge can be adjusted and controlled by the control unit 12 in accordance with the requirements of different loads on the first operating voltage V1 or other application considerations, such as for the purpose of protecting the battery module B or lengthening the overall system lifetime. For example, the output voltages of the battery modules B of the stages of the power units 11A to 11C are different (e.g., the output voltages of the battery modules B of the stages of the power units 11A to 11C are 8V, 4V and 2V, respectively); or the time periods are not completely the same (the time period 0 to T1 is smaller than the time period T1 to T2, and the like). The invention is not particularly restricted thereto.

Figure 3A:
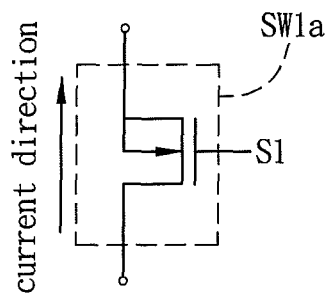
FIGS. 3A and 3B are schematic illustrations showing first switch devices.
Figure 3B:
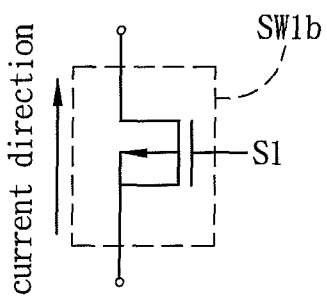

FIGS. 3A and 3B show different implementations of the first switch device of the power management system according to the preferred embodiment of the invention in practical applications. As shown in FIG. 3A, the first switch device SW1a is an N-MOSFET. As shown in FIG. 3B, the first switch device SW1b is a P-MOSFET.

Figure 3C:
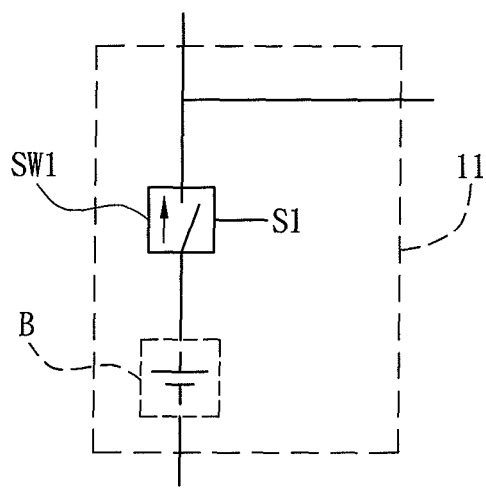
FIG. 3C is a schematic illustration showing a power unit.

In addition, the connections between the battery module B, the first switch device SW1 and the first diode D1 in the power unit 11 may also be changed. As shown in FIG. 3C, the connection order of the elements may be changed without changing the working principle.

Figure 4A:
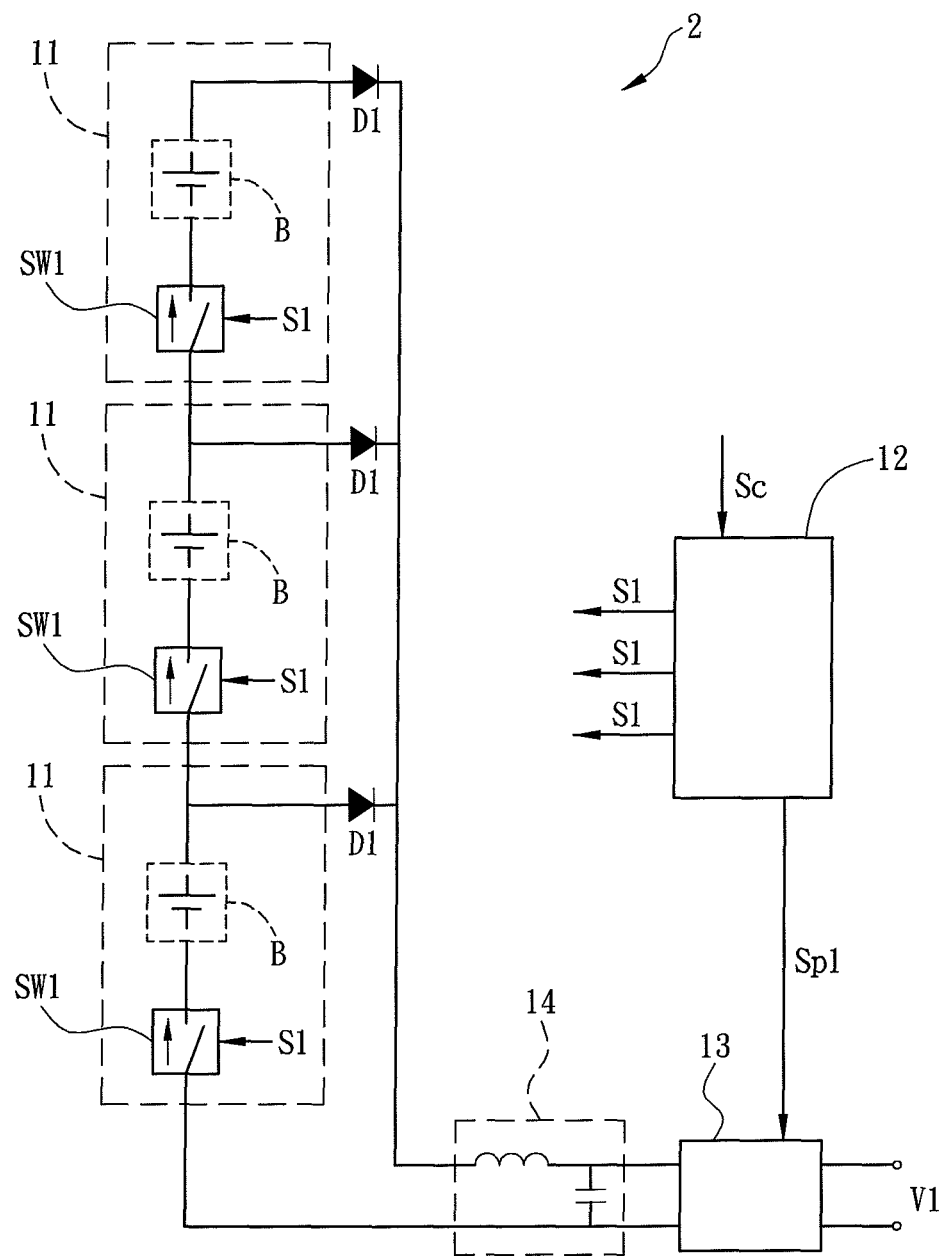
FIG. 4A is a schematic illustration showing a power management system according to a preferred embodiment of the invention.

FIG. 4A is a schematic illustration showing a power management system 2 according to a preferred embodiment of the invention. As shown in FIG. 4A, a power management system 2 is substantially the same as the power management system 1 except that the power management system 2 may further include a filter unit 14 electrically connected to the first polarity switch unit 13 for the purpose of decreasing the harmonic distortion of the first operating voltage. The filter unit 14 includes, for example, an inductor element, a capacitor element, a resistor element or a combination thereof. The other associated technological characteristics and working principles are the same as those of the power management system 1, and detailed descriptions thereof are omitted.

Figure 4B:
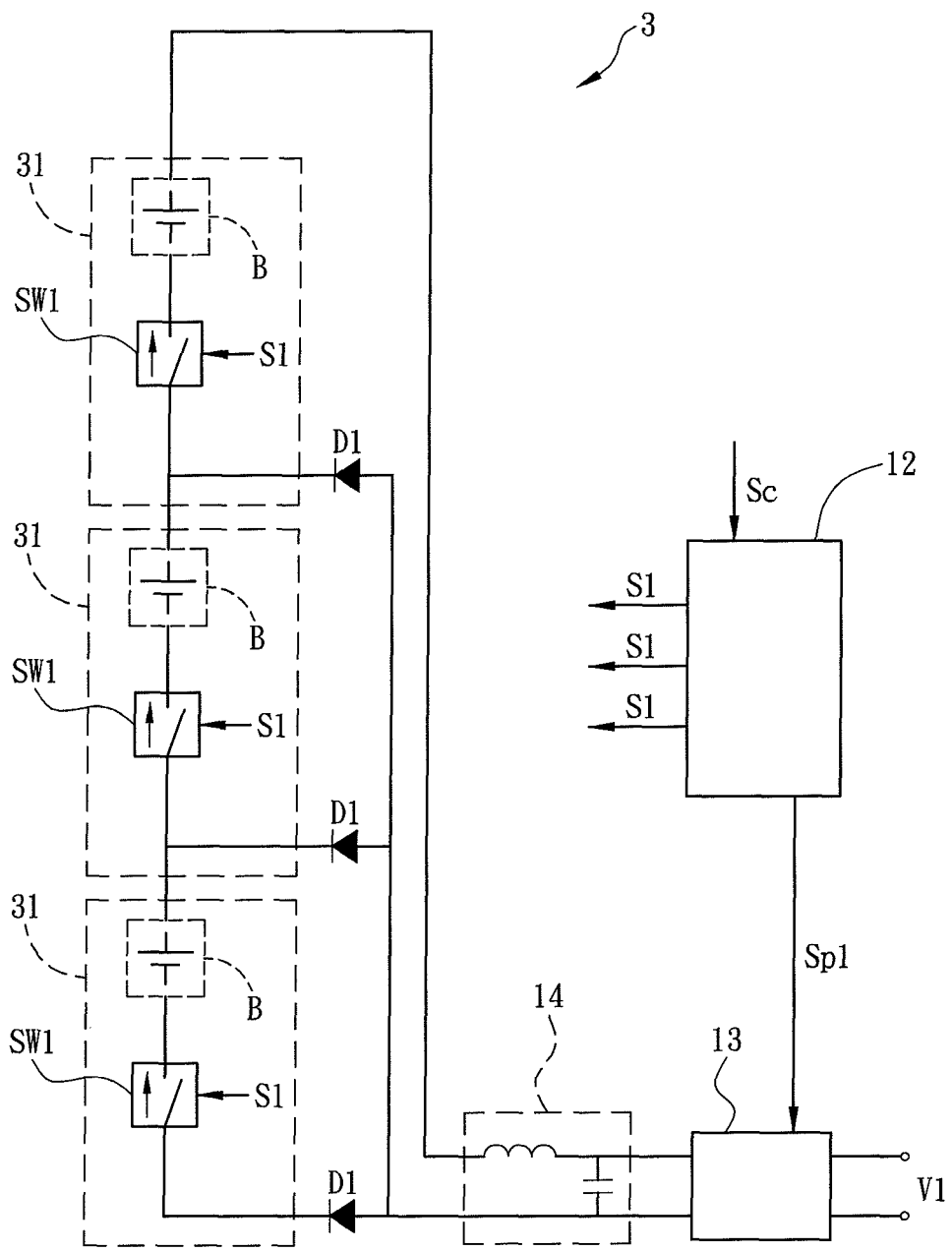
FIG. 4B is a schematic illustration showing a power management system according to a preferred embodiment of the invention.

FIG. 4B is a schematic illustration showing a power management system 3 according to a preferred embodiment of the invention. As shown in FIG. 4B, the circuit architecture of the power management system 3 is substantially the same as that of the power management system 2 except that the anodes of the first diodes D1 of the power units 31 in the power management system 3 are electrically connected to each other. Besides, the first polarity switch unit 13 is connected to the other end of the power unit string, which is different from the configuration of the power management system 2. The other associated technological characteristics and working principles are the same as those of the power management system 2, and detailed descriptions thereof are omitted.

It is to be specified that the following embodiments are modified based on the power management system 2 or 3, wherein the filter unit 14 is to decrease the harmonic portion of the first operating voltage V1 so that each embodiment achieves the better efficiency, and it is not an essential element required for achieving the minimum requirement of each embodiment. That is, even if the filter unit 14 is not included, each embodiment still can be implemented in the practical application.

Figure 4C:
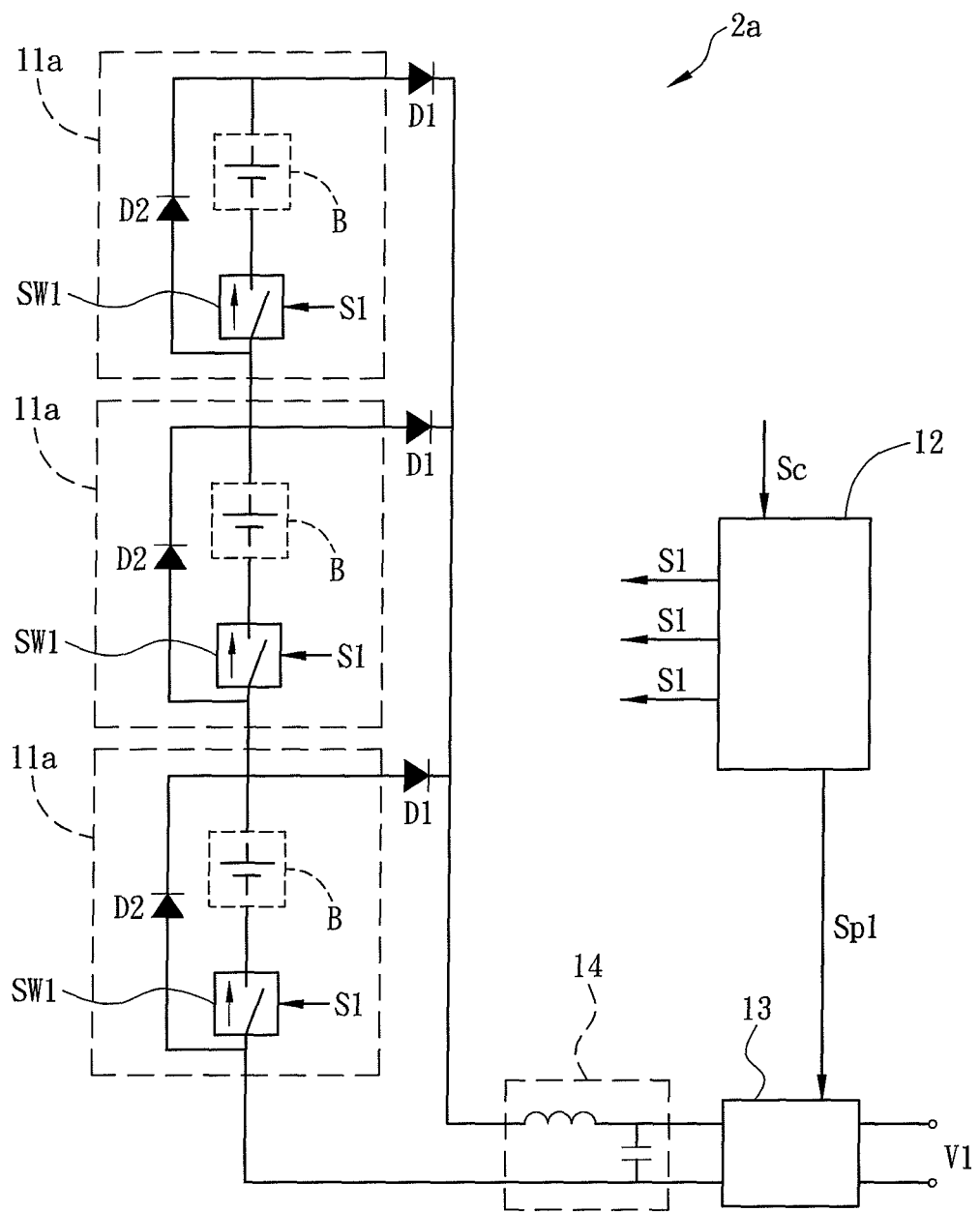
FIG. 4C is a schematic illustration showing a power management system according to a preferred embodiment of the invention.

FIG. 4C is a schematic illustration showing a power management system 2a according to a preferred embodiment of the invention. As shown in FIG. 4C, what is different from the power management system 2 is that each power unit 11a further includes a second diode D2. The second diode D2 is connected in parallel to the serial module formed by the battery module B and the first switch device SW1 to provide a discharge bypass path. When the control unit 12 finds that a certain battery module B is to be depleted and cannot continue discharging through the control signal Sc, the corresponding S1 signal can be used to turn off the first switch device SW1 and stop the discharge of the battery module B. At this time, the other battery modules B can still continue to discharge through the discharge current bypass path of the second diode D2.

Figure 4D:
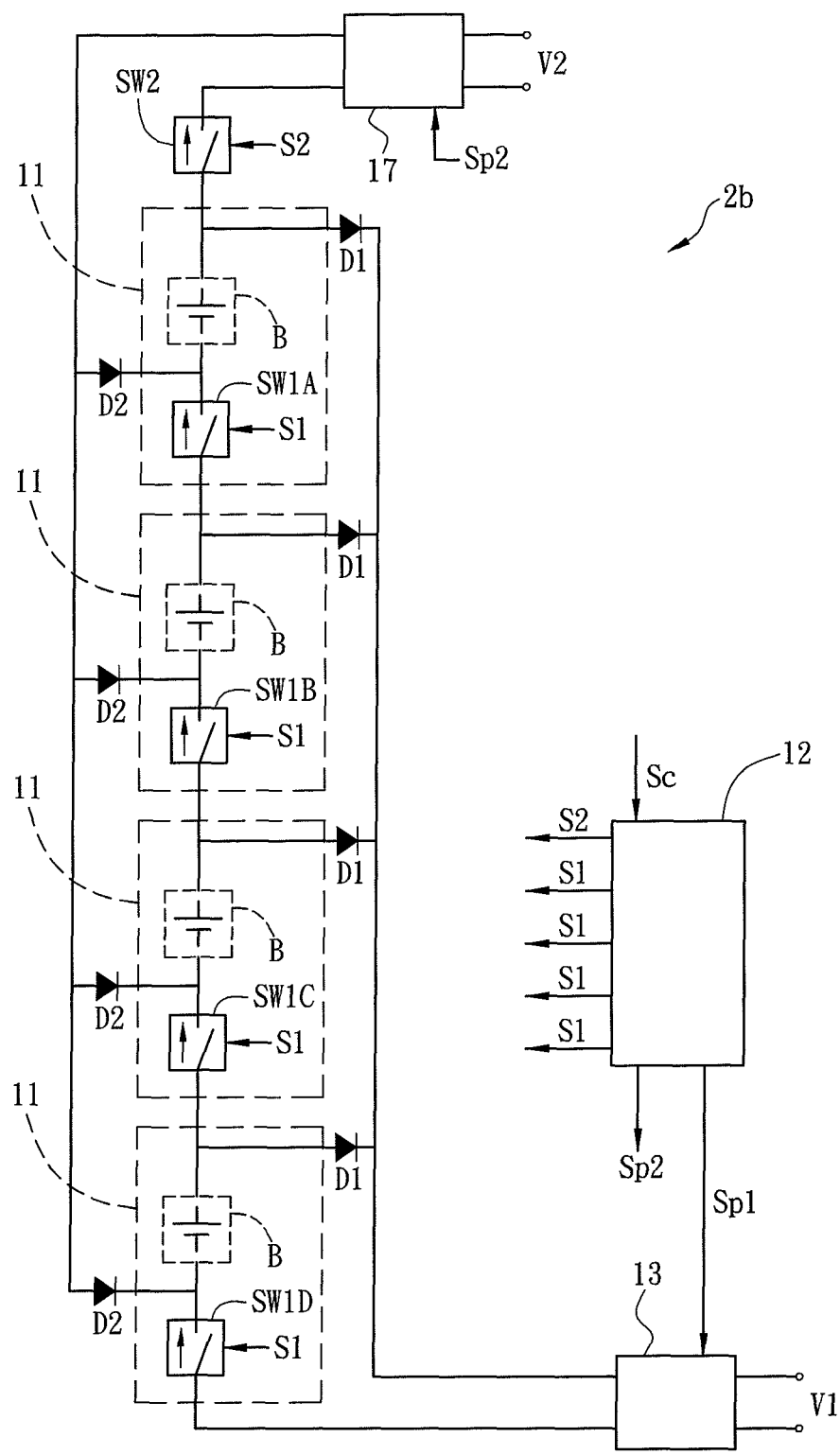
FIG. 4D is a schematic illustration showing a power management system according to a preferred embodiment of the invention.

FIG. 4D is a schematic illustration showing a power management system 2b according to a preferred embodiment of the invention. As shown in FIG. 4D, what is different from the power management system 2 is that the power management system 2b further includes at least a second diode D2 and a second polarity switch unit 17. In addition, the power management system 2b includes four power units 11 serially connected together. For example, the power management system 2b includes four second diodes D2; however, in other embodiments, the power management system may include one, two or more second diodes and in this invention it is not limited.

One end of each second diode D2 is electrically connected to one of the power units 11, and the other end of the second diode D2 is connected to a second common node. In this embodiment, the anodes of the second diodes are electrically connected to each other and the coupled to the second common node. The second polarity switch unit 17 is electrically connected to the power unit string, the second common node, and the control unit 12, and outputs a second operating voltage V2. The second operating voltage V2 is an AC voltage. The second polarity switch unit 17 controls the polarity of the second operating voltage V2 in accordance with a second adjusting signal Sp2 outputted from the control unit 12. In addition, the power management system 2b further includes a second switch device SW2, which is electrically connected between the power unit string and the second polarity switch unit 17, and electrically connected to the control unit 12. The second switch device SW2 turns on or off in accordance with a second switch signal S2 outputted from the control unit 12.

For example, when the first switch devices SW1B, SW1C and SW1D and the second switch device SW2 turn on, the first switch unit SW1A turns off, the first operating voltage V1 is equal to the sum of voltages of the battery modules B corresponding to the first switch devices SW1B, SW1C and SW1D, and the second operating voltage V2 is equal to the voltage of the battery module B corresponding to the first switch device SW1A; when the first switch devices SW1A, SW1C and SW and the second switch device SW2 turn on, the first switch unit SW turns off, the first operating voltage V1 is equal to the sum of the voltages of the battery modules B corresponding to the first switch devices SW1C and SW1D, and the second operating voltage V2 is equal to the sum of the voltages of the battery modules B corresponding to the first switch devices SW1A and SW1B; and so on. In other words, controlling the first switch devices SW1A to SW1D and the second switch device SW2 to turn on or off can thereby control the outputs of the first operating voltage V1 and the second operating voltage V2 (e.g., make the first operating voltage V1 and the second operating voltage V2 to have a phase difference of 90 degrees).

Figure 4E:
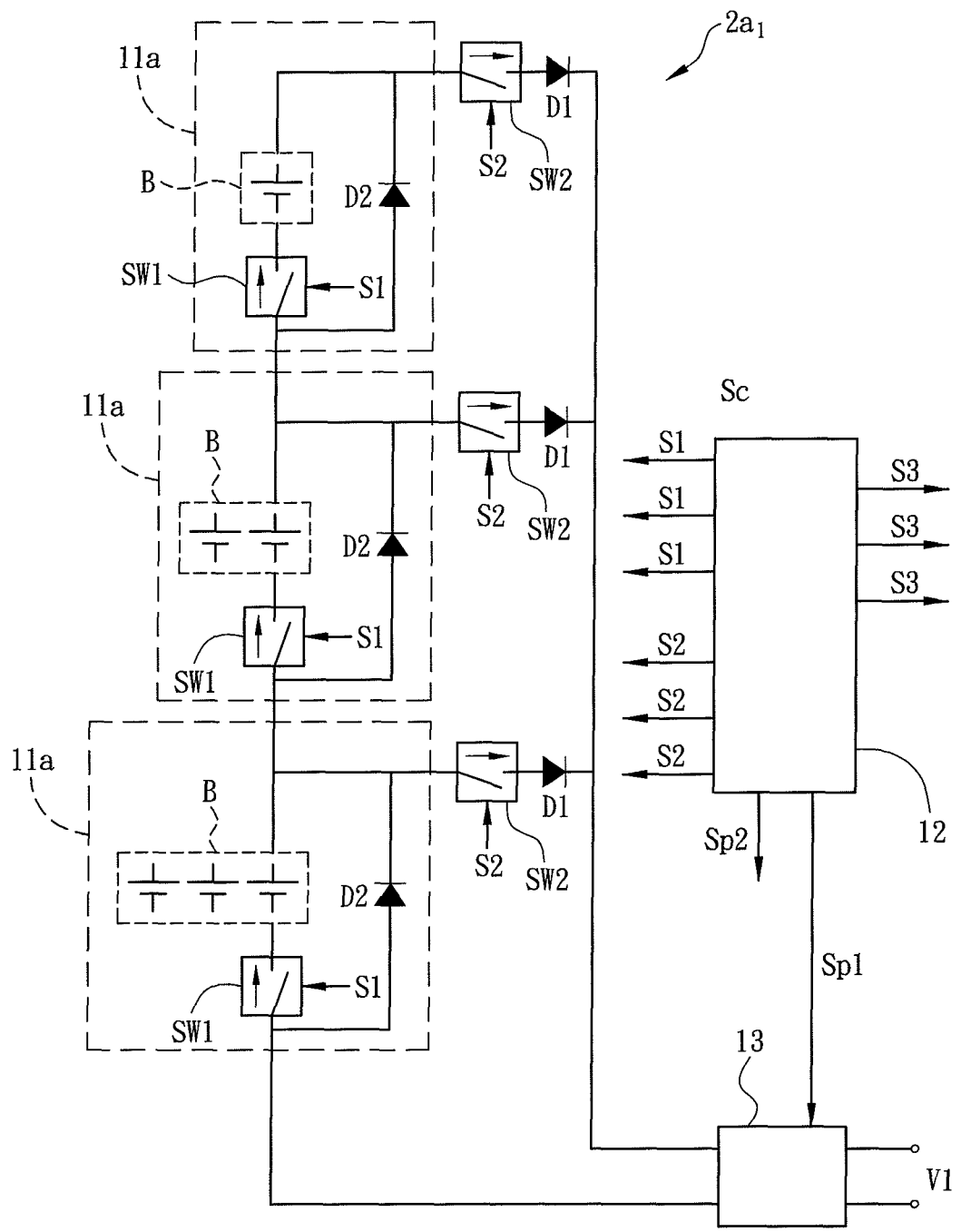
FIG. 4E is a schematic illustration showing a power management system according to a preferred embodiment of the invention.

FIG. 4E is a schematic illustration showing a power management system $2a_1$ according to a preferred embodiment of the invention. As shown in FIG. 4E, the power management system $2a_1$ is substantially the same as the power management system $2a$ except that the power management system $2a_1$ further includes at least a second switch device SW2 serially connected to the first diode D1, and that the control unit 12 outputs a second switch signal S2 in accordance with the control signal Sc to control the second switch device SW2 to turn on or off, and thereby controlling the discharge current path, provided by the second switch device SW2 and the first diode D1, to be turned on or off. To be noted, the number of the second switch devices SW2 varies depending on the number of the first diodes D1. The power management system $2a_1$ includes three second switch devices SW2; however, in other embodiments, the power management system may include one, two or more second switch devices and in this invention it is not limited.

In addition, the battery modules B further have different capacities so that the power management system $2a_1$ can meet the requirements for more diversified output voltage waveforms by combining the battery modules B having different capacities.

Figure 4F:
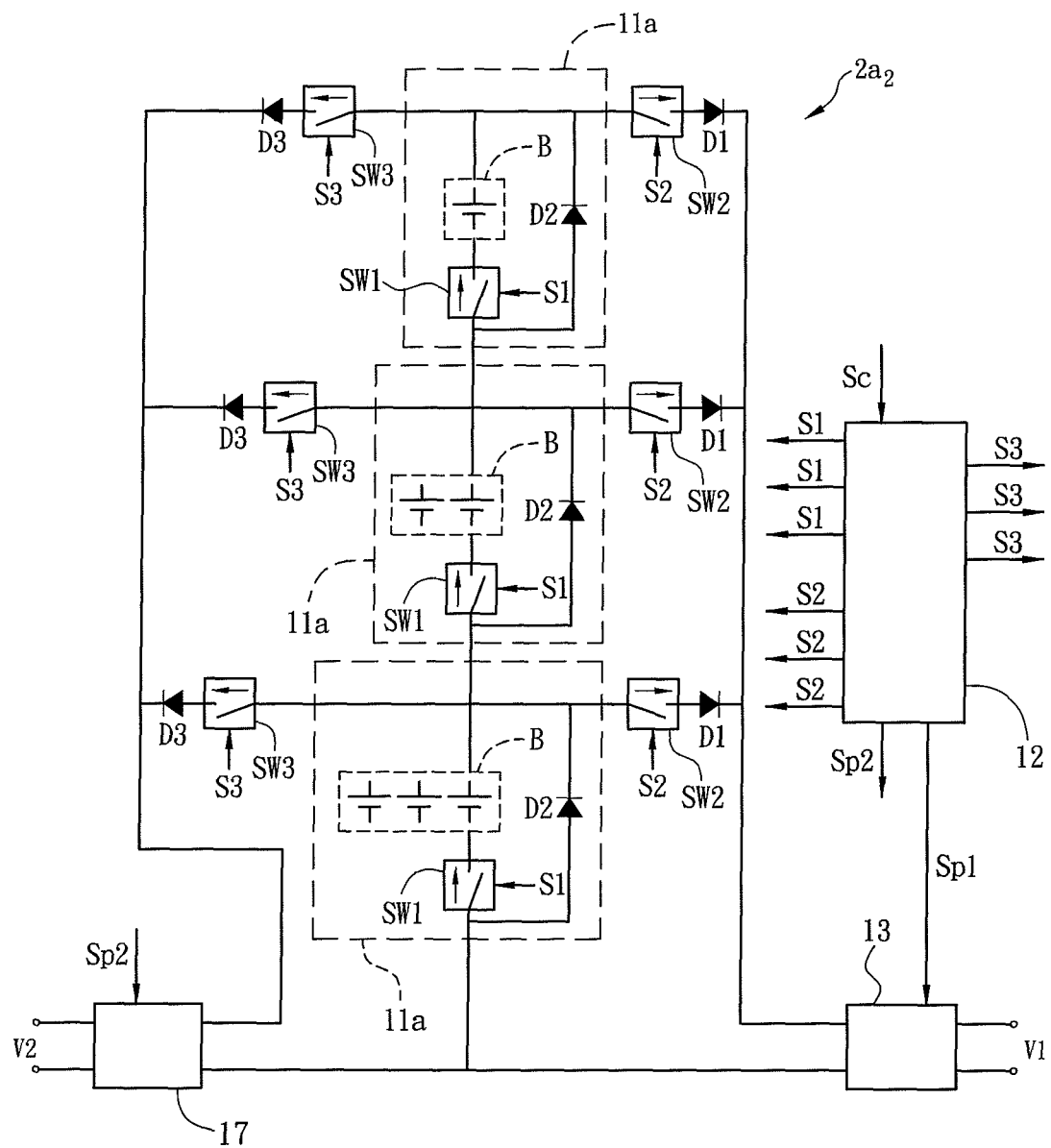
FIG. 4F is a schematic illustration showing a power management system according to a preferred embodiment of the invention.

FIG. 4F is a schematic illustration showing a power management system $2a_2$ according to a preferred embodiment of the invention. As shown in FIG. 4F, the power management system $2a_2$ is substantially the same as the power management system $2a_1$ except that the power management system $2a_2$ has a two phase output, and further includes at least a third switch device SW3, at least a third diode D3 and a second polarity switch unit 17.

Each third switch device SW3 is electrically connected to one of the power units 11a. The third switch device SW3 is electrically connected to the control unit 12, and turns on or off in accordance with a third switch signal S3 outputted from the control unit 12.

Each third diode D3 is serially connected to one of the third switch devices SW3 and is connected to a second common node to provide a discharge current path.

To be noted, the power management system $2a_2$ includes three third switch devices SW3 and three third diodes D3; however, in other embodiments, the power management system may include one, two or more second switch devices and in this invention it is not limited.

The second polarity switch unit 17 is electrically connected to the power unit string, the second common node and the control unit 12, and outputs a second operating voltage V2. The control unit 12 outputs a second adjusting signal Sp2 to the second polarity switch unit 17 to control the polarity of the second operating voltage V2 so that the second operating voltage V2 becomes an AC voltage.

The third switch device SW3 of the power management system $2a_2$ controls the number of the power unit 11a discharging to the second polarity switch unit 17, and the working principle of the power management system $2a_2$ is similar to the integration of the power management system $2a$ and the power management system $2a_1$. The difference is that the power management system $2a_2$ can individually control the number of the power unit 11a discharging to the first polarity switch unit 13 and the number of the power unit 11a discharging to the second polarity switch unit 17 and thus provide the two phase AC voltage output by controlling the on and off combinations of the first switch device SW1, the second switch device SW2 and the third switch device SW3.

Figure 4G:
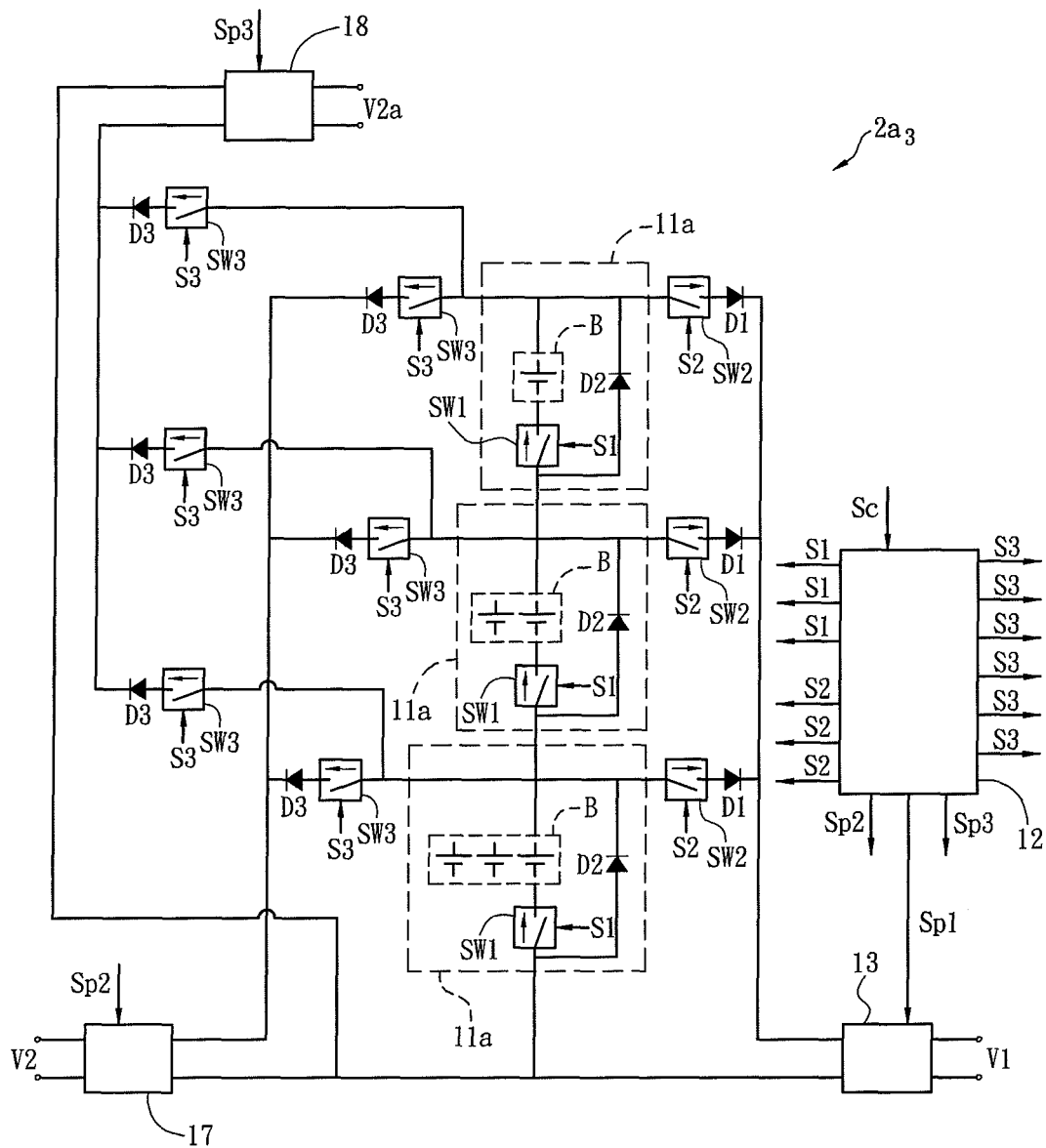
FIG. 4G is a schematic illustration showing a power management system according to a preferred embodiment of the invention.

FIG. 4G is a schematic illustration showing a power management system $2a_3$ according to a preferred embodiment of the invention. As shown in FIG. 4G, the power management system $2a_3$ is substantially the same as the power management system $2a_2$ except that the power management system $2a_3$ has a multi-phase output. The power management system $2a_3$ includes not only a second polarity switch unit 17 but also another second polarity switch unit 18. In addition, the third diode D3 is connected to another second common node, and the second polarity switch unit 18 is electrically connected to the another second common node and the power unit string.

In this embodiment, the power management system $2a_3$ and the power management system $2a_2$ have the similar working principles. The difference is that the third switch devices SW3 and the third diodes D3 of the power management system $2a_3$ are divided into two groups individually coupled to the second polarity switch units 17 and 18, so that the combinations of the ON/OFF statuses of the third switch devices SW3 can be properly controlled to provide the desired three-phase AC voltage output.

It is to be particularly noted that the number of the second common nodes in different embodiments may be three or more than three. The number of the second common node may be at least one, and the number of the second polarity switch units is changed corresponding to the number of the second common nodes, so that the power management system can provide the multi-phase output. So, the invention is not particularly restricted thereto.

Figure 4H:
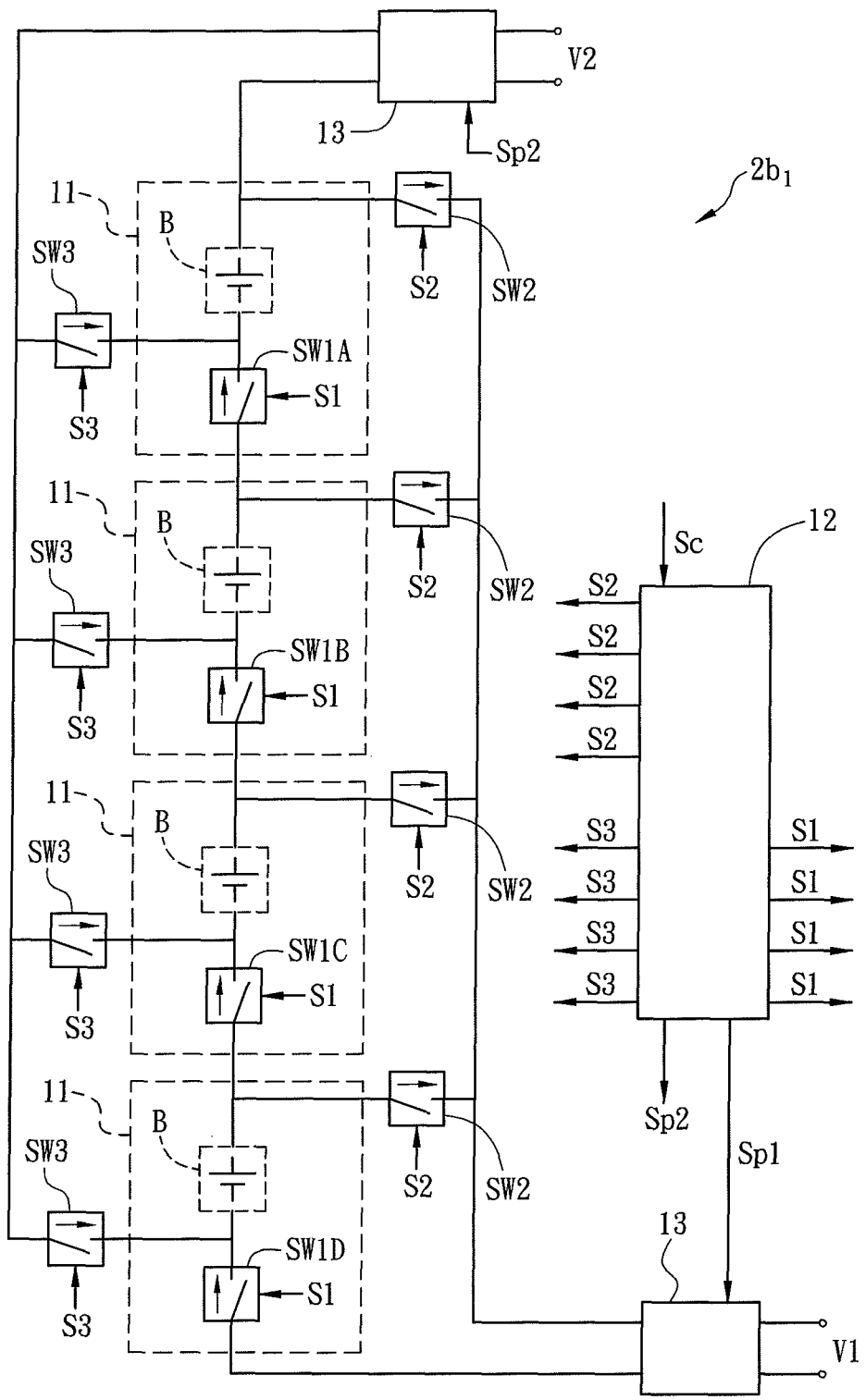
FIG. 4H is a schematic illustration showing a power management system according to a preferred embodiment of the invention.

FIG. 4H is a schematic illustration showing a power management system $2b_1$ according to a preferred embodiment of the invention. As shown in FIG. 4H, the power management system $2b_1$ is substantially the same as the power management system $2b$ except that the second switch device SW2, which should be connected between the power unit string and the second polarity switch unit 17, is removed from the power management system $2b_1$, each first diode D1 is replaced with a second switch device SW2, each second diode D2 is replaced with a third switch device SW3, and the control unit 12 is electrically connected to each second switch device SW2 and each third switch device SW3, and outputs a second switch signal S2 and a third switch signal S3 to control the second switch device SW2 and the third switch device SW3 to turn on or off, respectively. The working principle of the power management system $2b_1$ is substantially the same as that of the power management system $2b$, so the detailed description thereof is omitted.

Figure 4I:
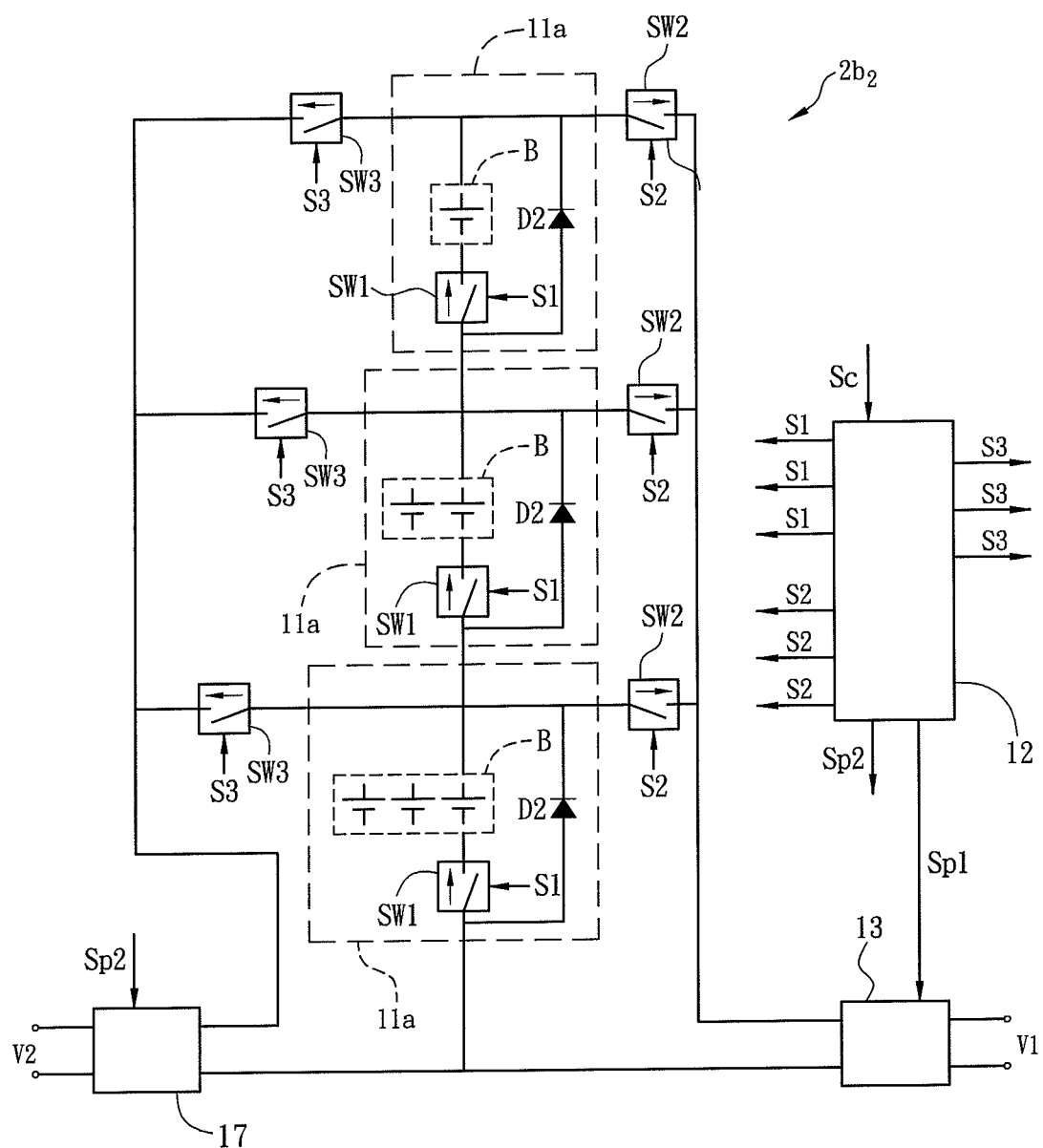
FIG. 4I is a schematic illustration showing a power management system according to a preferred embodiment of the invention.

FIG. 4I is a schematic illustration showing a power management system $2b_2$ according to a preferred embodiment of the invention. As shown in FIG. 4I, the power management system $2b_2$ is substantially the same as the power management system $2a_2$ except that the first diode D1, which should be connected to the second switch device SW2, and the third diode D3, which should be connected to the third switch device SW3, are removed from the power management system $2b_2$. The working principle of the power management system $2b_2$ is substantially the same as that of the power management system $2a_2$, so the detailed description thereof is omitted.

Figure 4J:
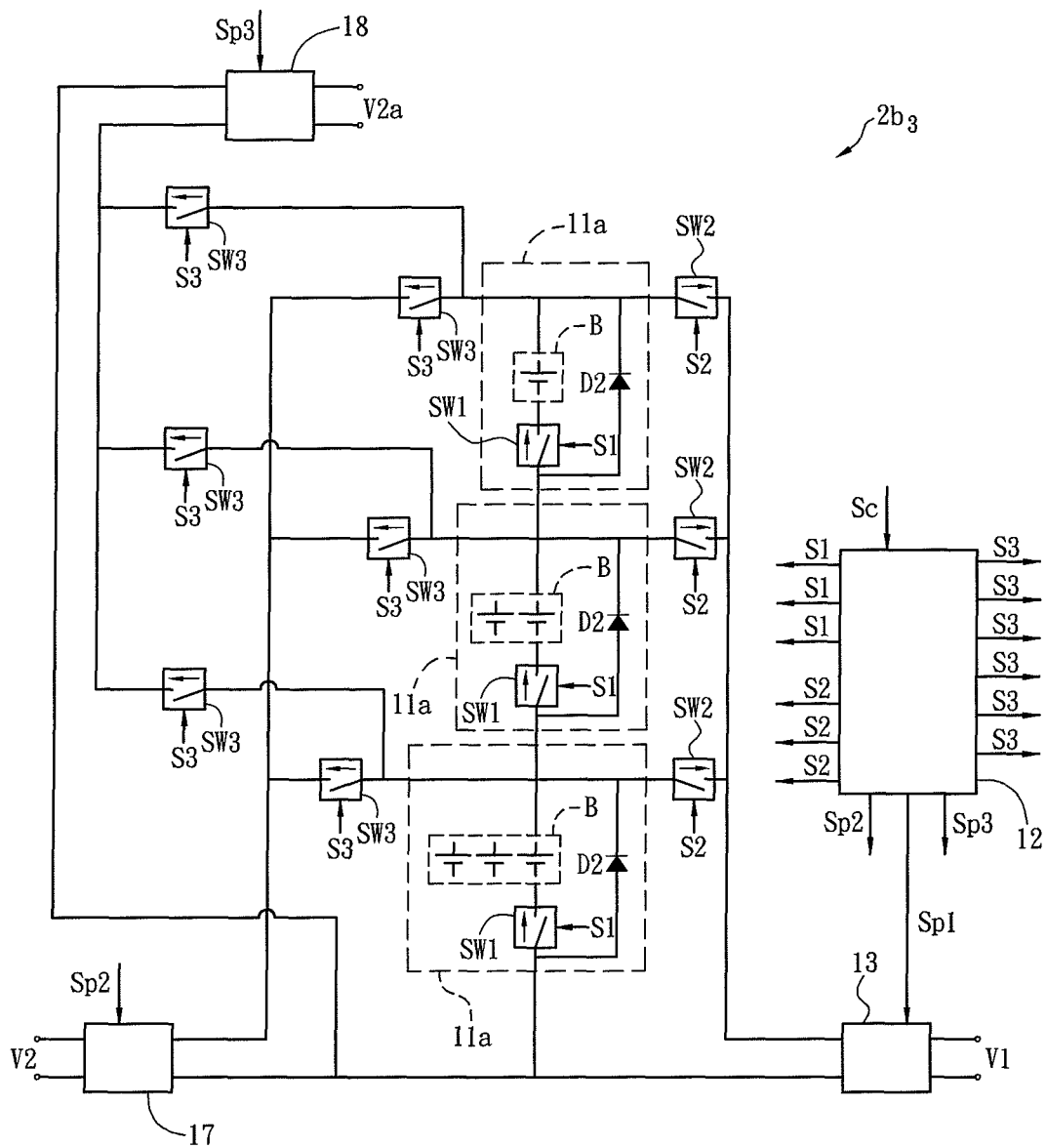
FIG. 4J is a schematic illustration showing a power management system according to a preferred embodiment of the invention.

FIG. 4J is a schematic illustration showing a power management system $2b_3$ according to a preferred embodiment of the invention. As shown in FIG. 4J, the power management system $2b_3$ is substantially the same as the power management system $2a_3$ except that the first diode D1, which should be connected to the second switch device SW2, and the third diode D3, which should be connected to the third switch device SW3, are removed from the power management system $2b_3$. The working principle of the power management system $2b_3$ is substantially the same as that of the power management system $2a_3$, so the detailed description thereof is omitted.

It is to be noted that in the embodiment having the multi-phase AC voltage output, the control signal Sc may further include a signal representing the voltage value of each second common node or a signal representing the voltage value of each second operating voltage, and the invention is not particularly restricted thereto.

Figure 5A:
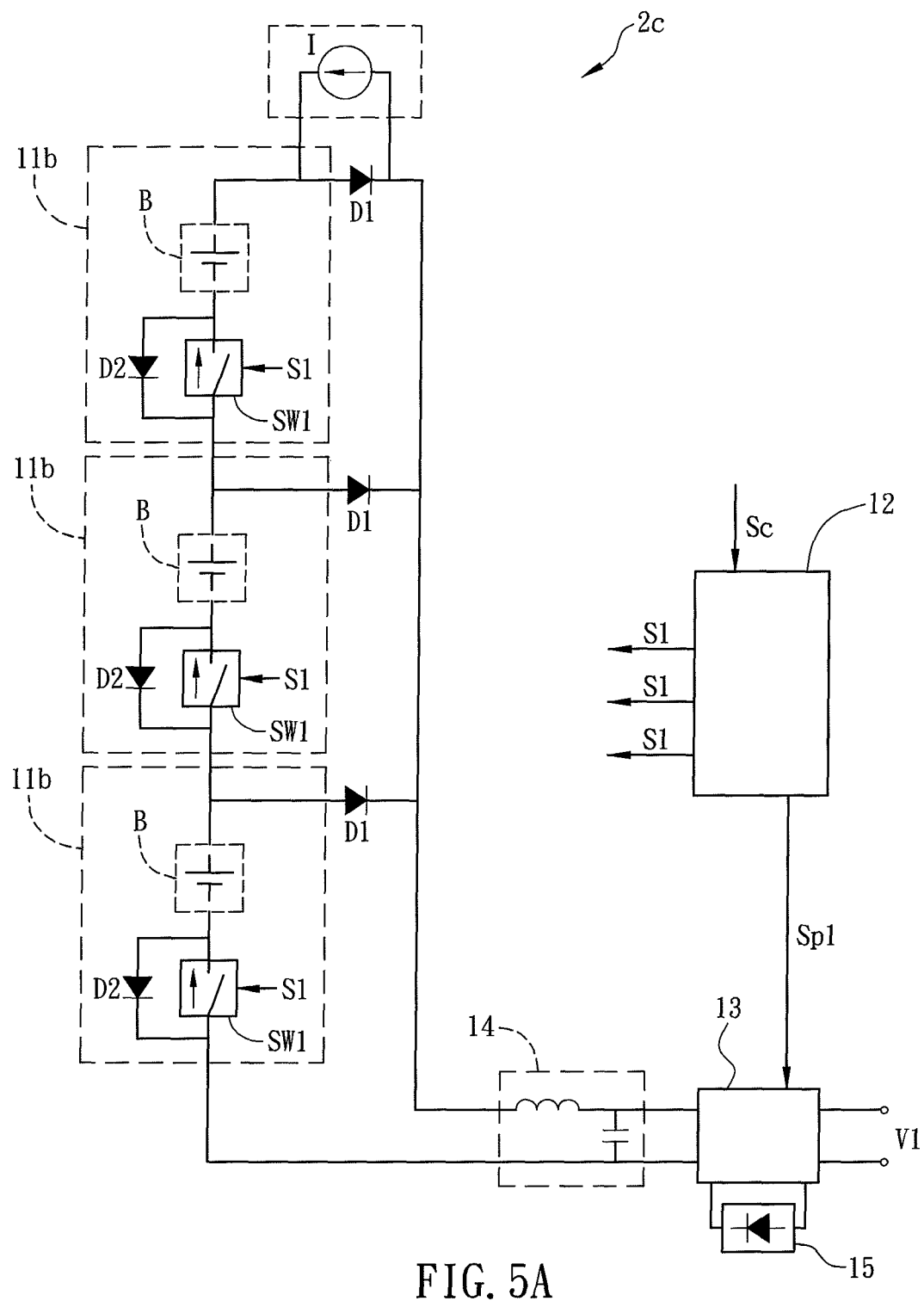
FIG. 5A is a schematic illustration showing a power management system according to a preferred embodiment of the invention.

FIG. 5A is a schematic illustration showing a power management system $2c$ according to a preferred embodiment of the invention. As shown in FIG. 5A, the circuit architecture of the power management system $2c$ is substantially the same as that of the power management system 2 except that the power management system $2c$ further includes a current controller I and a rectifying unit 15, and each power unit $11b$ further includes a second diode D2, wherein the current controller I may be a current source or a current limiter.

The second diode D2 is connected in parallel to the first switch device SW1 to provide a charge path for the battery module B. The current controller I is electrically connected to the first polarity switch unit 13 and the battery unit string. The rectifying unit 15 is connected in parallel to the first polarity switch unit 13, and can provide a charge current path when being connected to an external charge power through the first polarity switch unit 13.

When the power units $11b$ are to be charged, the output end of the first polarity switch unit 13 may serve as the input end of the AC power during charging, and the current controller I controls the charging current direction and the charging current value to provide the electric power to the battery module B of each power unit $11b$. That is, the power units $11b$ are not used for discharge, but to receive the electric power, provided form the external power, to perform the charge function. Compared with the power management system 2, the power units have not only the discharge function but also the charge function, and can be used repeatedly.

Figure 5B:
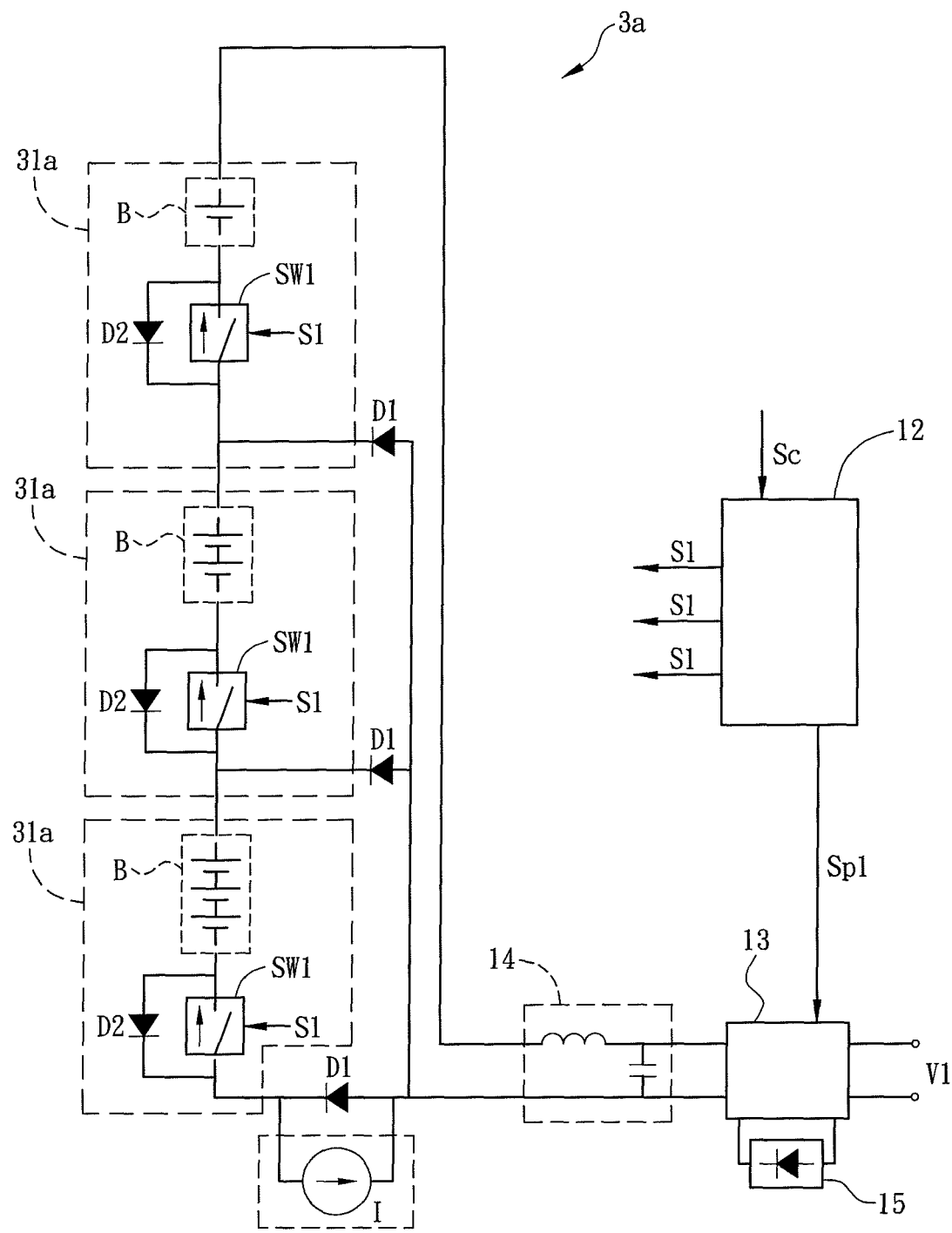
FIG. 5B is a schematic illustration showing a power management system according to a preferred embodiment of the invention.

FIG. 5B is a schematic illustration showing a power management system $3a$ according to a preferred embodiment of the invention. As shown in FIG. 5B, the circuit architecture of the power management system $3a$ is substantially the same as that of the power management system 3 except that the power management system $3a$ further includes a current controller I and a rectifying unit 15, and each power unit $11c$ further includes a second diode D2.

The second diode D2 is connected in parallel to the first switch device SW1 to provide a charge path for the battery module B. The current controller I is electrically connected to the first polarity switch unit 13 and the battery unit string. The rectifying unit 15 is connected in parallel to the first polarity switch unit 13. When being connected to an external charge power through the first polarity switch unit 13, the rectifying unit 15 can provide a charge current path.

The working principles of the added elements of this embodiment with respect to the power management system 3 are the same as those of the power management system $2c$ and can be found hereinabove, so detailed descriptions thereof are omitted.

It is to be noted that the battery modules B have different numbers of batteries in this embodiment. That is, the battery modules B have different capacities. Because the numbers of the serially connected batteries of the battery modules are different, the output voltages of the battery modules B are also different. Using different numbers of batteries connected in series and/or in parallel to construct the battery modules B can make the waveform of the first operating voltage V1 become more diversified to satisfy the requirement of the connected load. Also, the capacity of each battery module B may also be directly proportional to its discharge duty cycle.

Figure 5C:
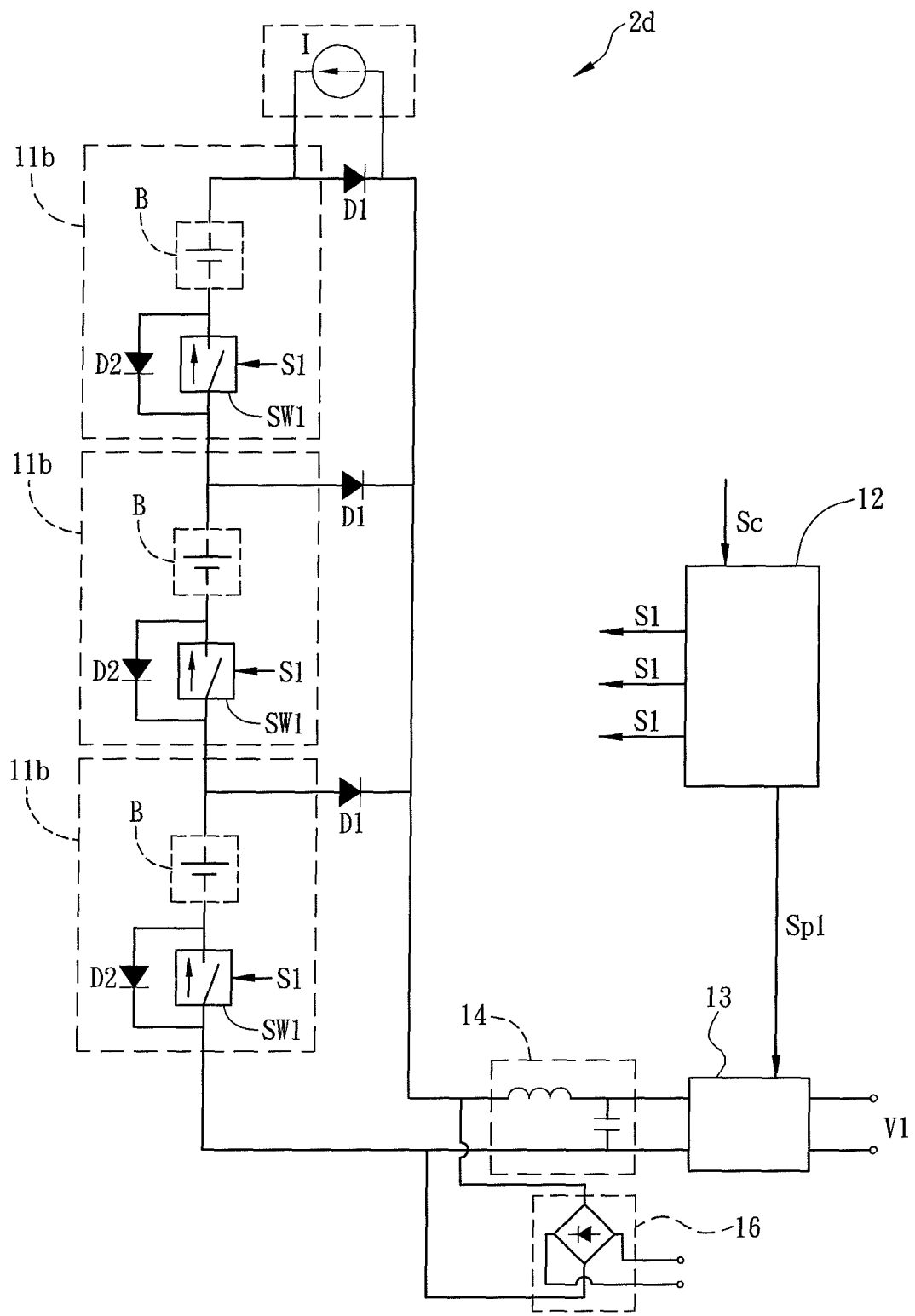
FIG. 5C is a schematic illustration showing a power management system according to a preferred embodiment of the invention.

FIG. 5C is a schematic illustration showing a power management system $2d$ according to a preferred embodiment of the invention. As shown in FIG. 5C, the circuit architecture of the power management system $2d$ is substantially the same as that of the power management system $2c$ except that the power management system $2d$ further includes a charge circuit 16 electrically connected to the power units $11b$. The charge circuit 16 is, for example, an extra and auxiliary charge circuit, and includes a charge power and a bridge rectifier. The charge power may be an AC power or a DC power for charging the power units $11b$.

Because the power management system $2d$ has the additional added charge circuit 16 for charging the battery module B without through the first polarity switch unit 13, the rectifying unit 15 may be omitted.

Figure 5D:
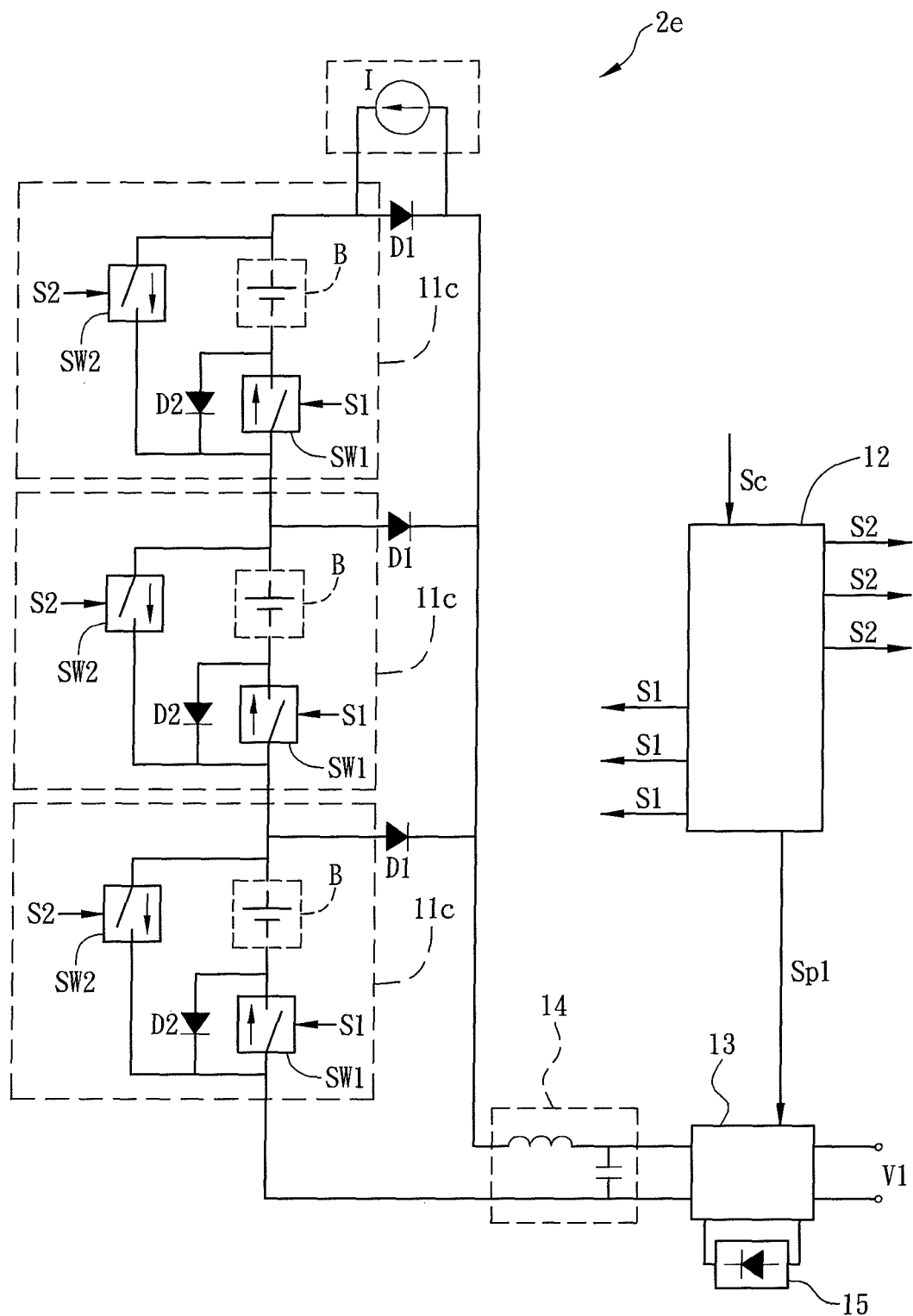
FIG. 5D is a schematic illustration showing a power management system according to a preferred embodiment of the invention.

FIG. 5D is a schematic illustration showing a power management system $2e$ according to a preferred embodiment of the invention. As shown in FIG. 5D, the circuit architecture of the power management system $2e$ is substantially the same as that of the power management system $2c$ except that each power unit $11c$ further includes a second switch device SW2, which is connected in parallel to the serial module, formed by the battery module B and the first switch device SW1, to provide a charge bypass path, and is electrically connected to the control unit 12, which individually outputs a second switch signal S2 to each second switch device SW2 and individually controls each second switch device SW2 to turn on or off in accordance with the control signal Sc.

For the sake of illustration, this embodiment follows the three-stage power module, defined from bottom to top, in the power management system 1. When any stage's battery module B does not need or is not suitable for the charge process (e.g., the stage's battery module B has reached the saturation state), the control unit 12 can turn on the second switch device SW2 to force the stage's battery module B to be bypassed in the charge loop. On the contrary, the second switch device SW2 is turned off to charge the battery module B of the stage of power unit.

Figure 5E:
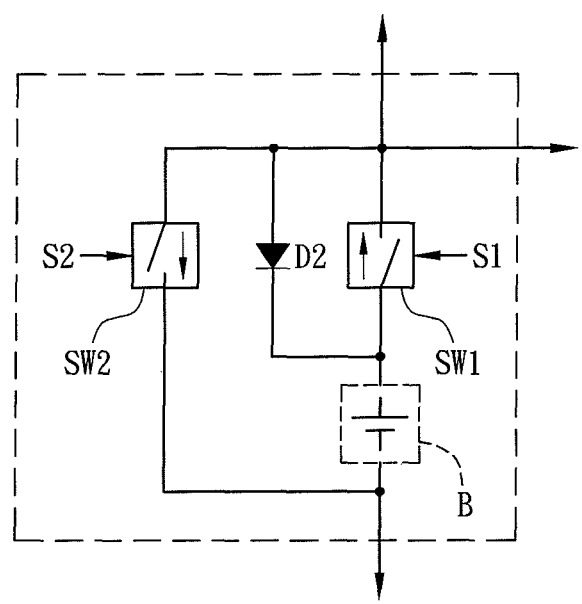
FIG. 5E is a schematic illustration showing a power unit.

FIG. 5E shows a modification of the power unit $11c$, wherein only the connection order of the elements is changed, and the working principle is kept the same.

Figure 6A:
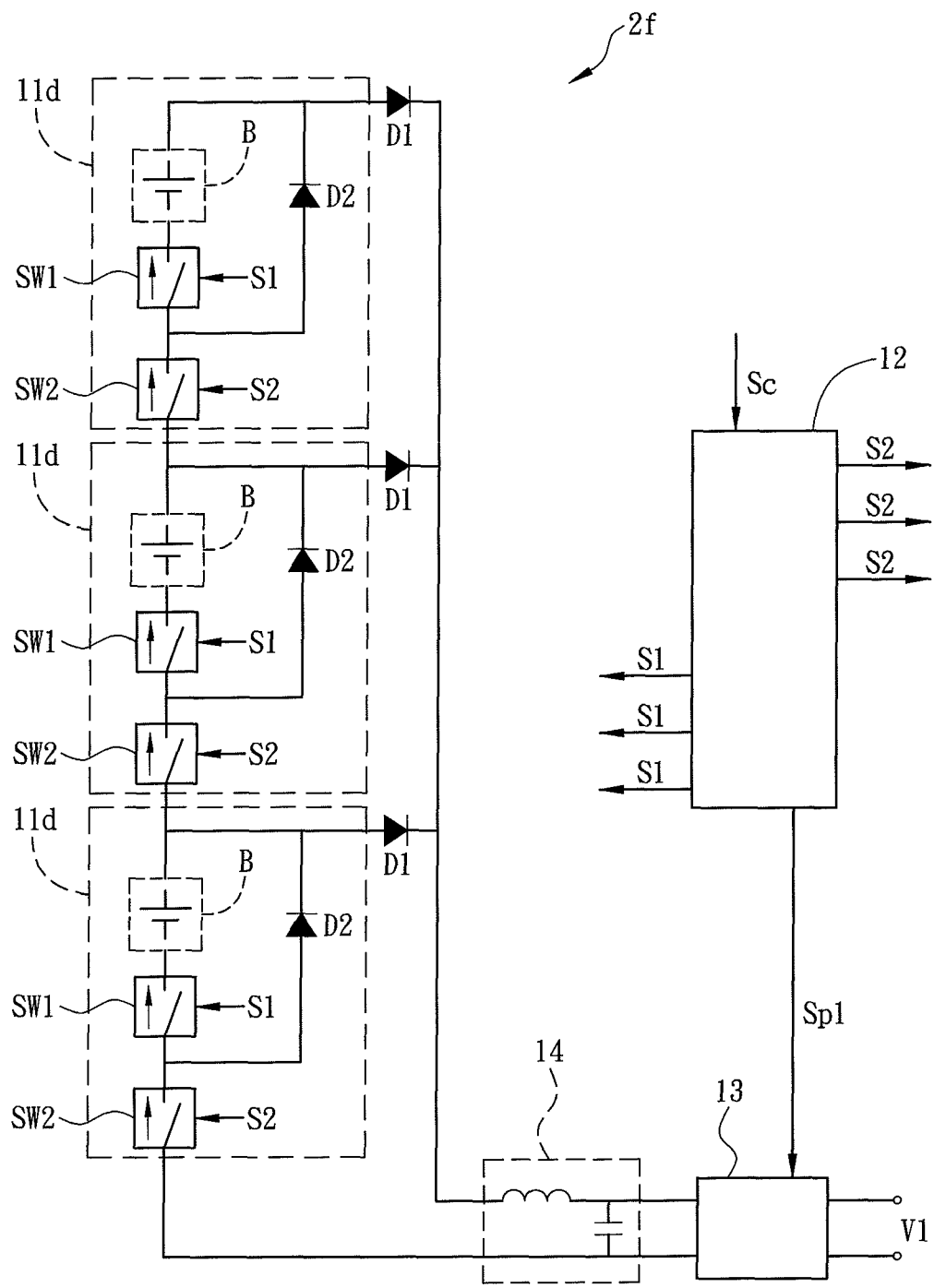
FIG. 6A is a schematic, illustration showing a power management system according to a preferred embodiment of the invention.

FIG. 6A is a schematic illustration showing a power management system $2f$ according to a preferred embodiment of the invention. As shown in FIG. 6A, the circuit architecture of the power management system $2f$ is substantially the same as that of the power management system $2a$ except that each power unit $11d$ of the power management system $2f$ further includes a second switch device SW2, which is electrically connected to the serial module of the battery module B and the control unit 12. The control unit 12 individually outputs a second switch signal S2 to each second switch device SW2 and individually controls each second switch device SW2 to turn on or off in accordance with the control signal Sc.

For the sake of illustration, this embodiment follows the three-stage power module, defined from bottom to top, in the power management system 1. When the voltage of one stage of battery module B needs to be outputted, the control unit 12 can control the second switch device SW2, pertaining to the first-stage power unit $11d$, to turn on and start the discharge. When the voltages of two stages of battery modules B need to be outputted, the control unit 12 can control the second switch devices SW2, pertaining to the first-stage power unit $11d$ and the second-stage power unit $11d$, to turn on and start the discharge, and so on.

It is to be noted that the battery module B of this embodiment may be, for example, a fuel cell or a solar cell that needs not to be charged, and may also be any energy storage element for recovering the electric power through other mechanisms.

Figure 6B:
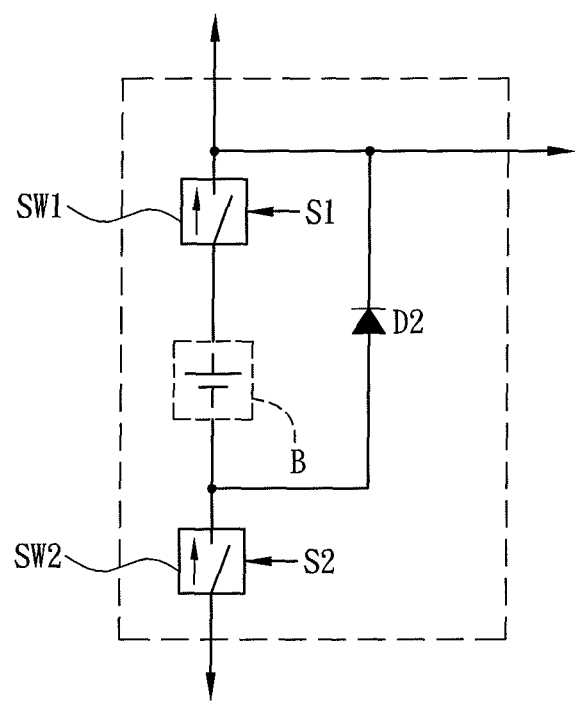
FIG. 6B is a schematic illustration showing a power unit.

FIG. 6B shows a modification of the power unit 11d, wherein only the connection order of the elements is changed, and the working principle is kept the same.

Figure 7A:
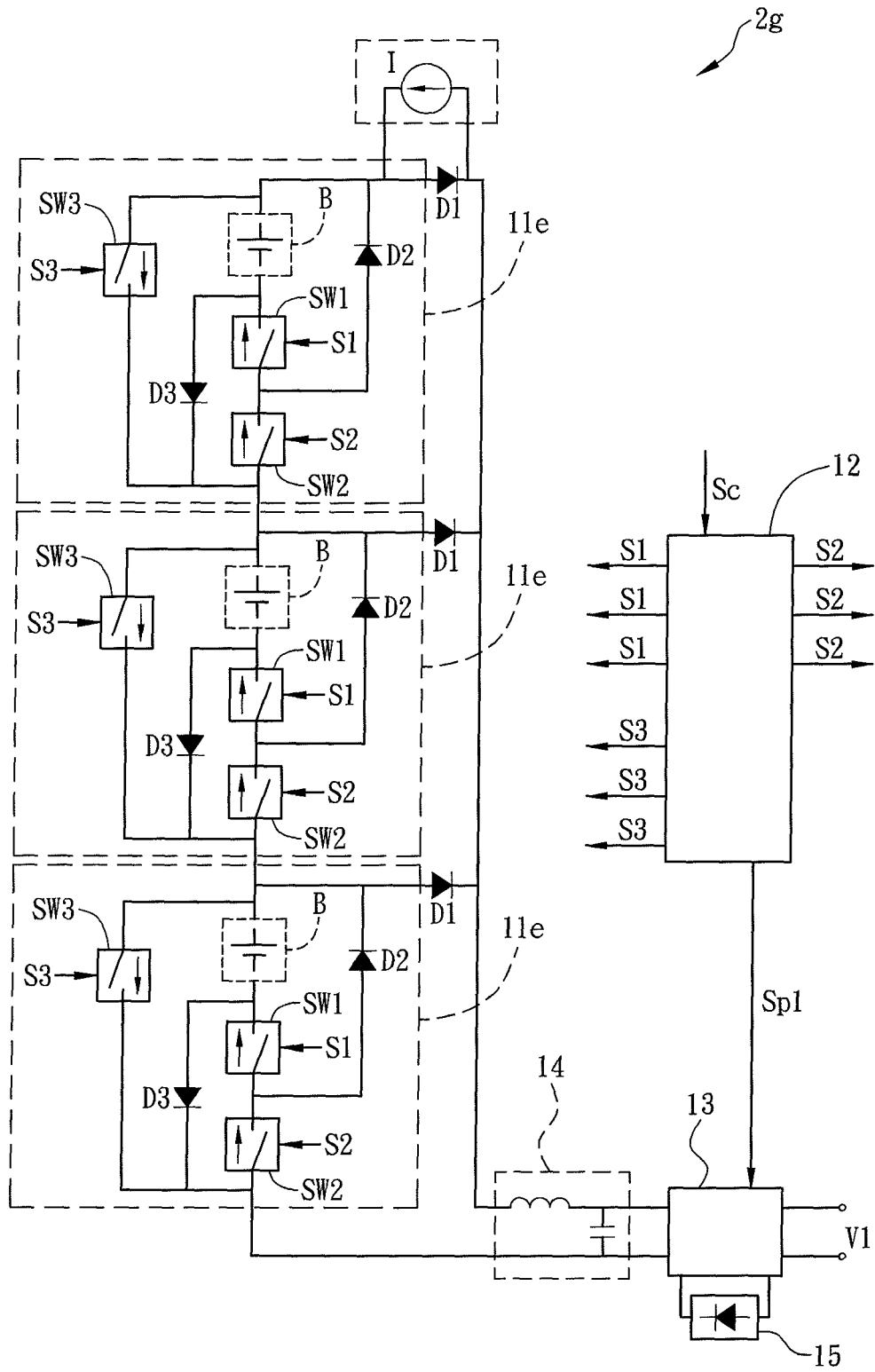
FIG. 7A is a schematic illustration showing a power management system according to a preferred embodiment of the invention.

FIG. 7A is a schematic illustration showing a power management system 2g according to a preferred embodiment of the invention. As shown in FIG. 7A, the circuit architecture of the power management system 2g is substantially the same as that of the power management system 2f except that the power management system 2g further includes a current controller I and a rectifying unit 15. The current controller I is electrically connected to the first polarity switch unit 13. The rectifying unit 15 is connected in parallel to the first polarity switch unit 13.

In addition, each power unit 11e further includes a third switch device SW3 and a third diode D3. The third switch device SW3 is electrically connected to the battery module B, the second switch device SW2 and the control unit 12 to provide a charge bypass path. The control unit 12 individually outputs a third switch signal S3 to each third switch device SW3 and individually controls each third switch device SW3 to turn on or off in accordance with the control signal Sc. The third diode D3 is connected in parallel to the first switch device SW1 and the second switch device SW2 to provide a charge path.

For the sake of illustration, this embodiment follows the three-stage power module, defined from bottom to top, in the power management system 1. The working principle of the power management system 2g upon discharge is the same as that of the power management system 2f, so detailed descriptions thereof are omitted. The working principle of the power management system 2g upon charge is the same as that of the power management system 2e. For example, when the provided charging power voltage is too low to charge multiple battery modules B, the control unit 12 turns on the third switch devices SW3 of the second-stage power unit and the third-stage power unit, and turns off the third switch device SW3 of the first-stage power unit to charge the battery module B of the first-stage power unit. After the power of the battery module B of the first-stage battery unit gets saturated, the control unit 12 turns on the third switch devices SW3 of the first-stage power unit and the third-stage power unit, and turns off the third switch device SW3 of the second-stage power unit to charge the battery module B of the second-stage power unit, and so on.

Of course, when the provided charging power can charge two battery modules B concurrently, the control unit 12 may also turn off the third switch devices SW3 of two stages of power units with the lower voltages, and turn on the third switch device SW3 of the other stage of power unit, so as to charge the corresponding two battery modules B concurrently.

In other words, the control unit 12 controls the third switch devices SW3 to turn on or off in accordance with the voltage level of the charging power, or when the charge power is a fluctuating AC voltage, so that the number of the battery modules B, which are concurrently charged, can be properly adjusted with considering the voltage of the charging power source, and the maximum energy using efficiency can be achieved.

Figure 7B:
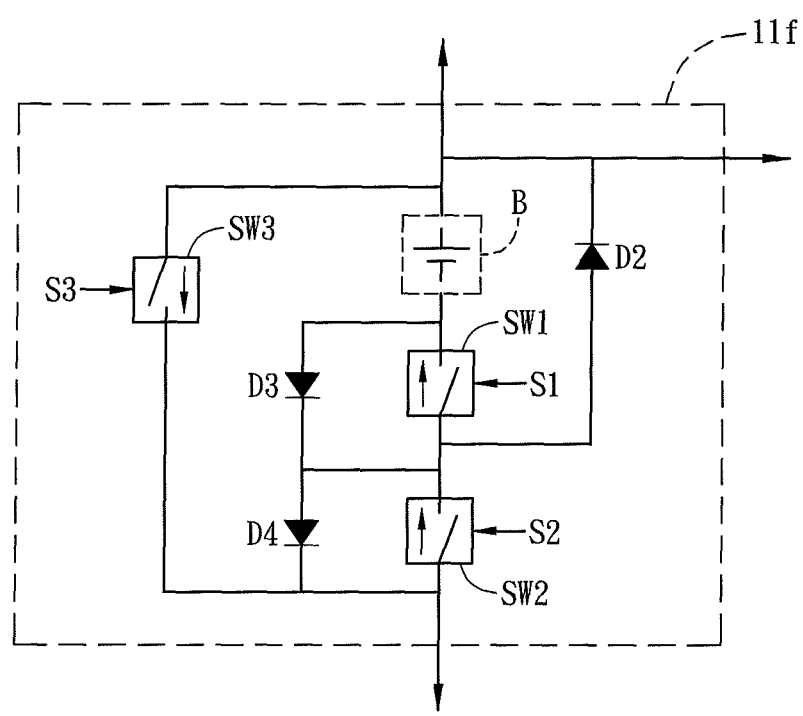
FIGS. 7B to 7D are schematic illustrations showing different power units.
Figure 7C:
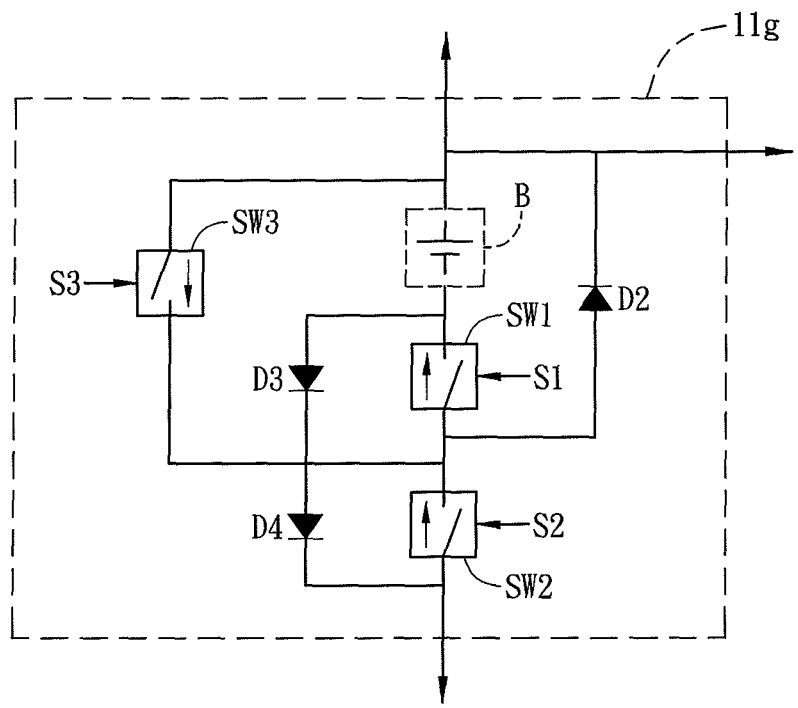
Figure 7D:
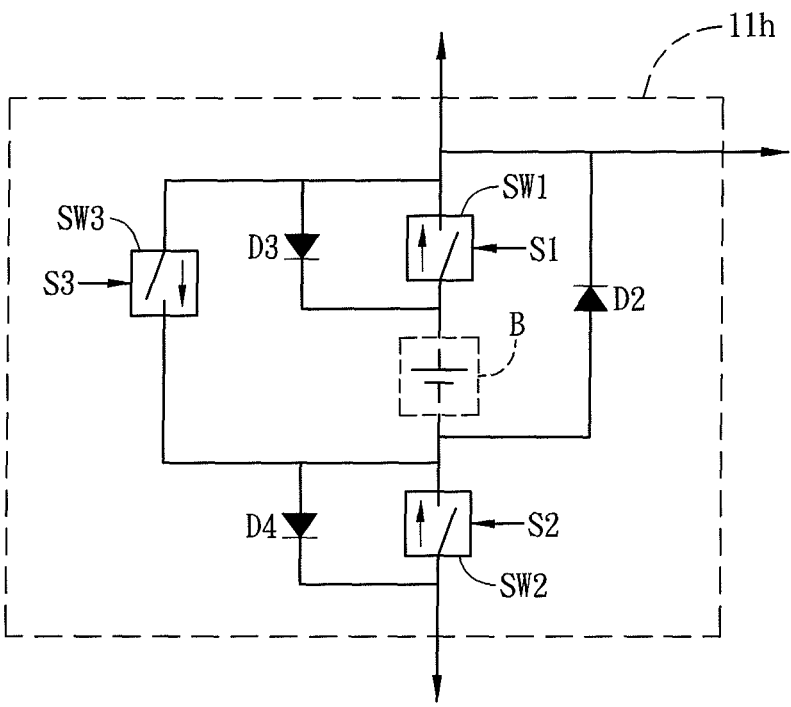

As shown in FIGS. 7B to 7D, what is different from the power unit 11f is that each of the power units 11f, 11g and 11h in the aspects of the power units of FIGS. 7B to 7D further includes a fourth diode D4, wherein the third diode D3 is modified as being connected in parallel to the first switch device SW1, and the fourth diode D4 is connected in parallel to the second switch device SW2. The differences between FIGS. 7B, 7C and 7D reside in the changed serial connection order of the battery module B, the first switch device SW1 and the second switch device SW2. The third diode D3 and the fourth diode D4 are for providing the charge current path, so that the charge current can flow through the third diode D3 or the fourth diode D4 when the corresponding first switch device SW1 or second switch device SW2 turns off. It is to be noted that even if the aspects shown in FIGS. 7B to 7D are different from that shown in FIG. 7A, the working principles thereof are still the same.

Figure 8:
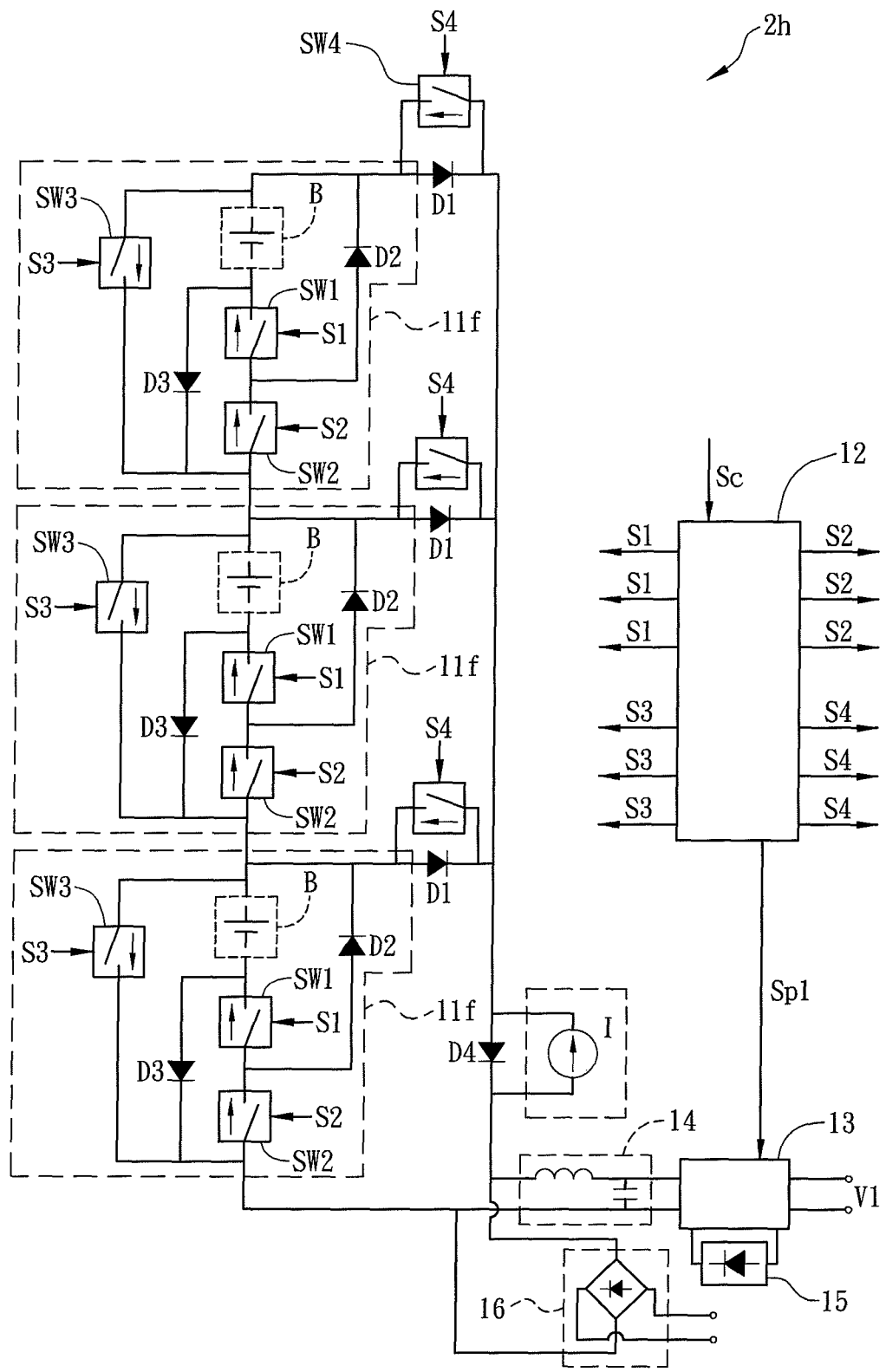
FIG. 8 is a schematic illustration showing a power management system according to a preferred embodiment of the invention.

FIG. 8 is a schematic illustration showing a power management system 2h according to a preferred embodiment of the invention. As shown in FIG. 8, the circuit architecture of the power management system 2h is substantially the same as that of the power management system 2g except that the power management system 2h further includes a fourth diode D4 and a charge circuit 16. The fourth diode D4 is connected in parallel to the current controller I. The charge circuit 16 is electrically connected to the power units 11f.

In addition, each power unit 11f further includes a fourth switch device SW4, which is connected in parallel to the first diode D1 to provide a charge current path and is electrically connected to the control unit 12. The control unit 12 individually outputs a fourth switch signal S4 to each fourth switch device SW4, and individually controls each fourth switch device SW4 to turn on or off in accordance with the control signal Sc.

The working principle of the power management system 2h is similar to that of the power management system 2g. The difference therebetween resides in that the control unit 12 of the power management system 2h can adjust the serial connection length of the battery modules B during the charge process by controlling the fourth switch device SW4 of each stage of power unit to coordinate with the voltage of the charging power. In addition, it is also possible to charge the battery module B through the charge circuit 16 connected to an external power.

Figure 9A:
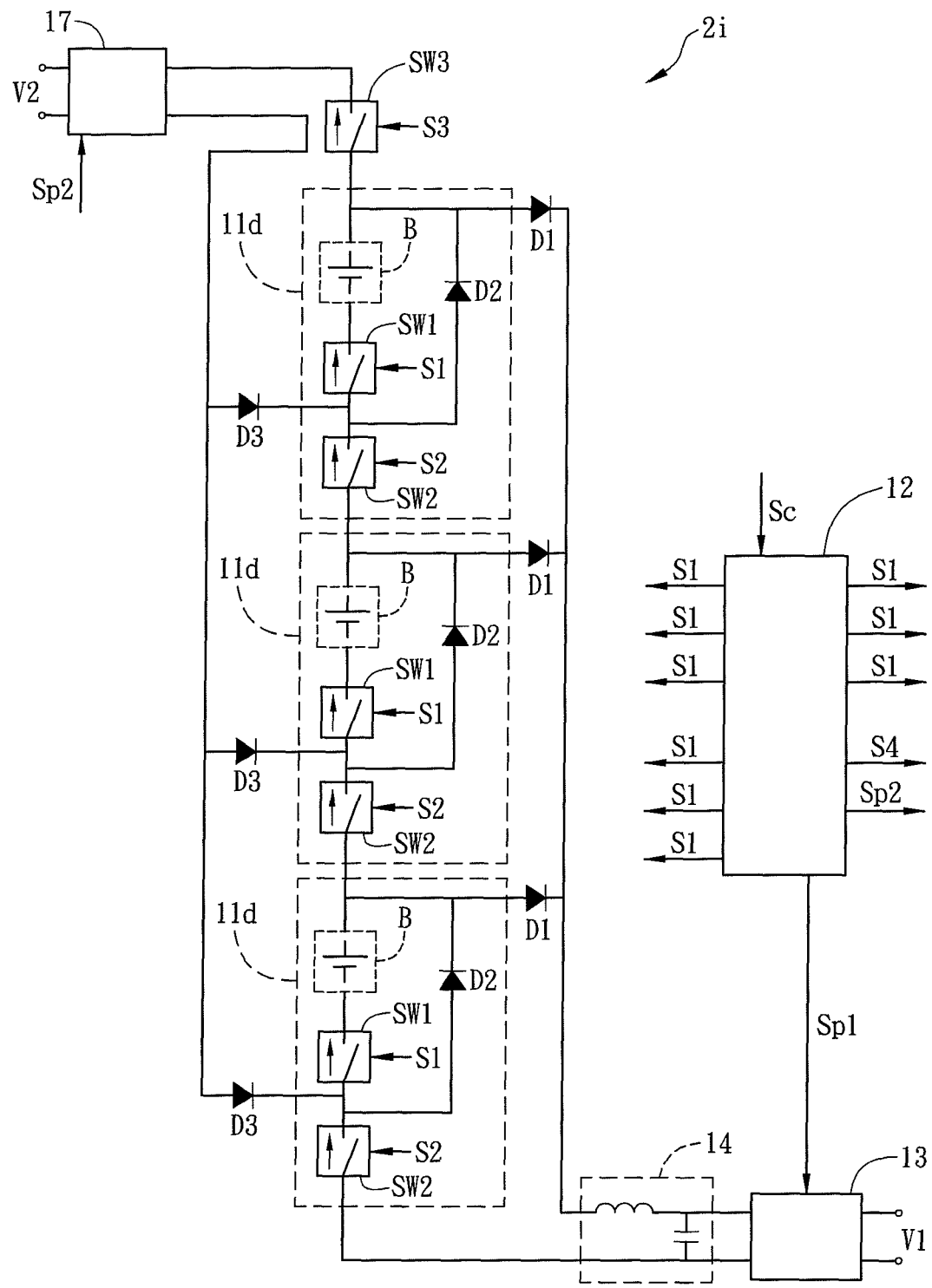
FIG. 9A is a schematic illustration showing a power management system according to a preferred embodiment of the invention.

FIG. 9A is a schematic illustration showing a power management system 2i according to a preferred embodiment of the invention. As shown in FIG. 9A, the circuit architecture of the power management system 2i is substantially the same as that of the power management system 2f except that the power management system 2i further includes at least a third diode D3, a second polarity switch unit 17 and a third switch device SW3.

One end of the third diode D3 is electrically connected to one of the power units 11d, and the other end of the third diode D3 is connected to a second common node. The second polarity switch unit 17 is coupled to the power unit string, the second common node, and the control unit 12, and outputs a second operating voltage V2. The second operating voltage V2 is an AC voltage. The second polarity switch unit 17 controls the polarity of the second operating voltage V2 in accordance with a second adjusting signal Sp2 outputted from the control unit 12. The third switch device SW3 is electrically connected to the power unit string, the second polarity switch unit 17 and the control unit 12, and turns on or off in accordance with a third switch signal S3 outputted from the control unit 12.

In this embodiment, the working principle of the power management system 2i is obtained by integrating those of the power management system 2c and the power management system 2f. That is, the control unit 12 controls the ON/OFF combinations of the switch devices so as to control the discharge of an arbitrary stage of power unit. Of course, it is also possible to select to output from the first polarity switch unit 13 or the second polarity switch unit 17. The third switch device SW3 controls whether the second operating voltage V2 is outputted or not.

For example, this embodiment follows the three-stage power module, defined from bottom to top, in the power management system 2f. When the first switch device SW1 and the second switch device SW2 of the first-stage power unit 11d turn on, the first switch device SW1 and the second switch device SW2 of the second-stage power unit 11d turn on, the first switch device SW1 of the third-stage power unit 11d turns on and the second switch device SW2 of the third-stage power unit 11d turns off, the first operating voltage V1 outputted from the first polarity switch unit 13 is provided by the first-stage power unit 11d and the second-stage power unit 11d, and the second operating voltage V2 outputted from the second polarity switch unit 17 is provided by the third-stage power unit 11d. In other words, various modifications of the first operating voltage V1 and the second operating voltage V2 can be obtained by the ON/OFF combinations of the switch devices.

Figure 9B:
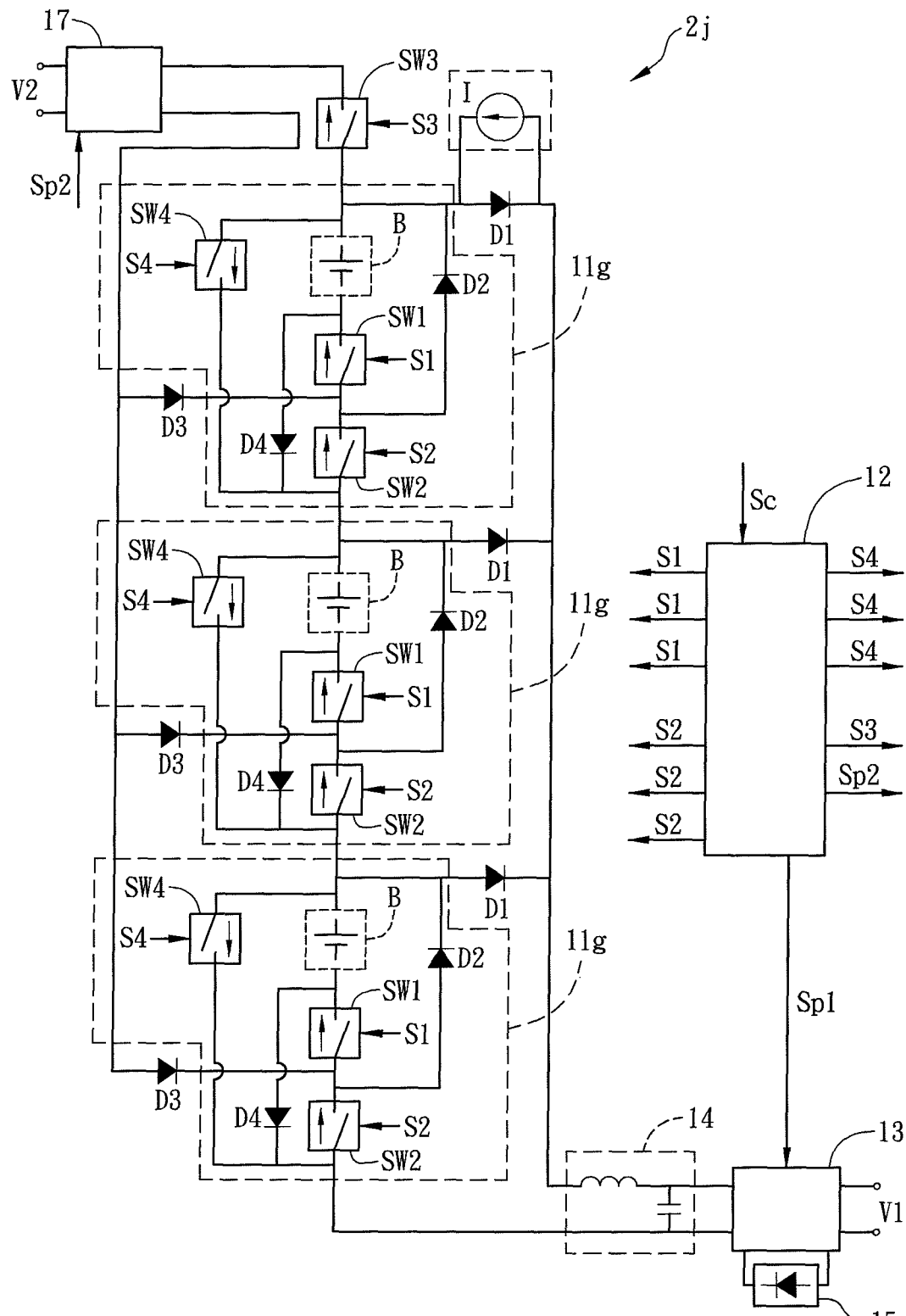
FIG. 9B is a schematic illustration showing a power management system according to a preferred embodiment of the invention.

FIG. 9B is a schematic illustration showing a power management system 2j according to a preferred embodiment of the invention. As shown in FIG. 9B, the circuit architecture of the power management system 2j is substantially the same as that of the power management system 2i except that the power management system 2j further provides the charge function and the charge control function. The power management system 2j further includes a current controller I and a rectifying unit 15, and each power unit 11g further includes a fourth switch device SW4 and a fourth diode D4. The connections and working principles of the fourth switch device SW4, the fourth diode D4, the current controller I and the rectifying unit 15 may be referred to those of the third switch device SW3, the third diode D3, the current controller I and the rectifying unit 15 of the power management system 2g.

Compared with the power management system 2i, the power management system 2j in this embodiment can use the control unit 12 to control the ON/OFF combinations of the switch devices to control the discharge of an arbitrary stage of power unit, and may also utilize the control unit 12 to control the ON/OFF combinations of the switch devices to charge an arbitrary stage of power unit.

Figure 9C:
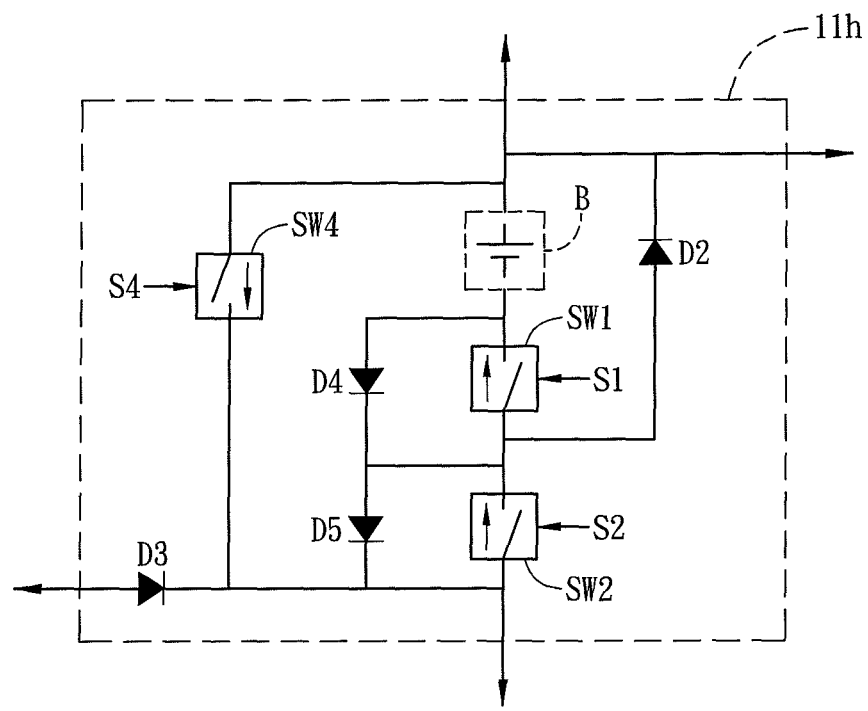
FIGS. 9C and 9D are schematic illustrations showing different power units.
Figure 9D:
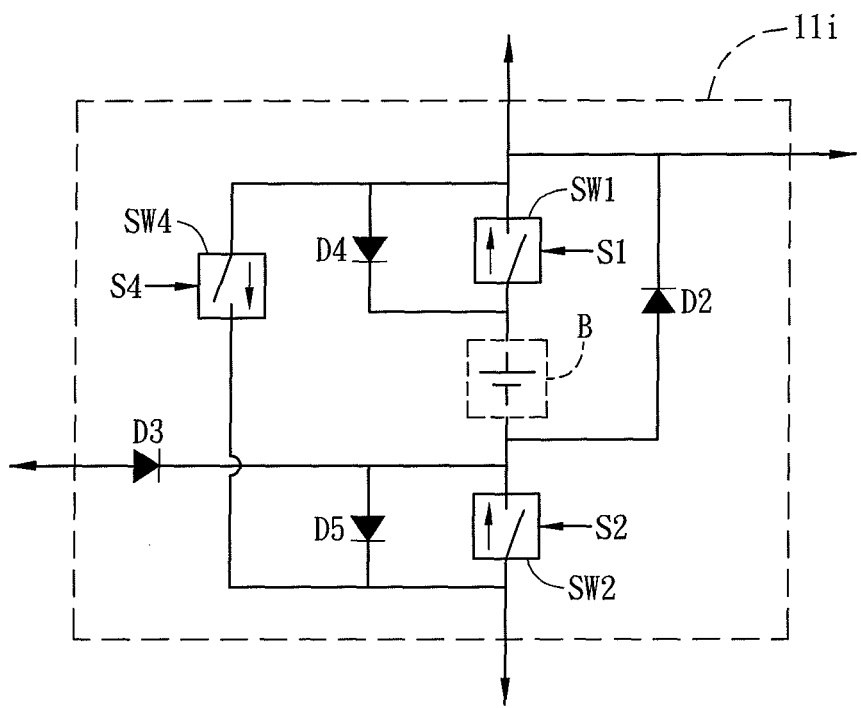

FIGS. 9C and 9D are schematic illustrations showing different power units. As shown in FIGS. 9C and 9D, each of the power units 11h and 11i includes a fifth diode D5, wherein the fourth diode D4 is modified as being connected in parallel to the first switch device SW1, while the fifth diode D5 is connected in parallel to the second switch device SW2. The difference between FIGS. 9C and 9D resides in that the changed serial connection order of the battery module B, the first switch device SW1 and the second switch device SW2. It is to be noted that even if the aspects shown in FIGS. 9C and 9D are different from that shown in FIG. 9B, the working principles thereof are still the same.

Figure 10A:
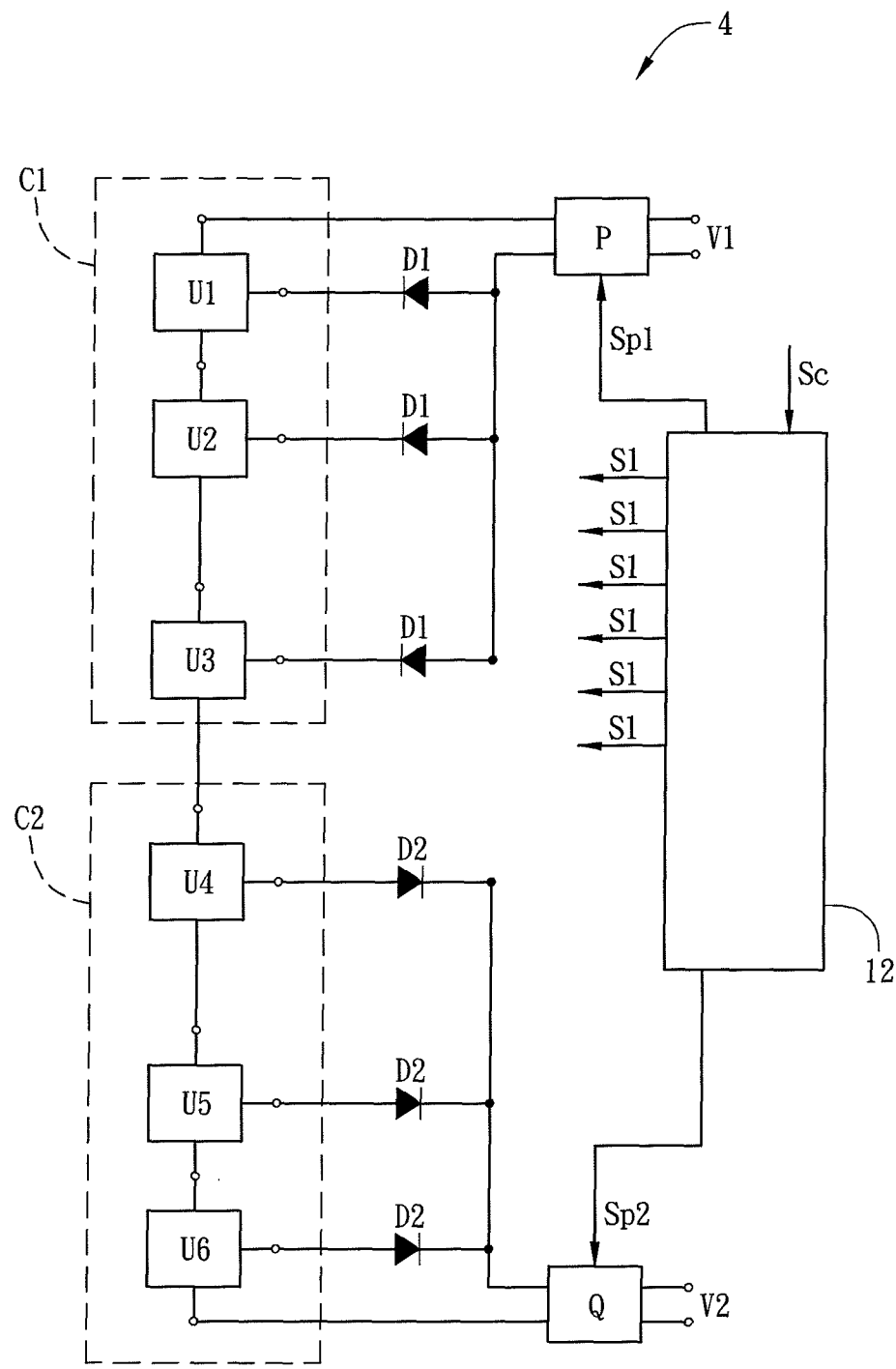
FIG. 10A is a schematic illustration showing a power management system according to a preferred embodiment of the invention.
Figure 10B:
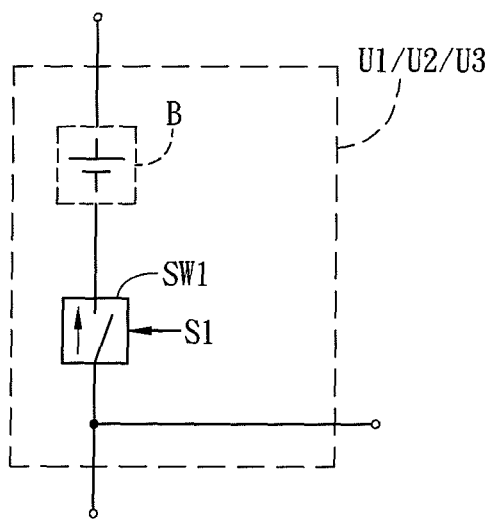
FIGS. 10B and 10C are schematic illustrations showing different power units.
Figure 10C:
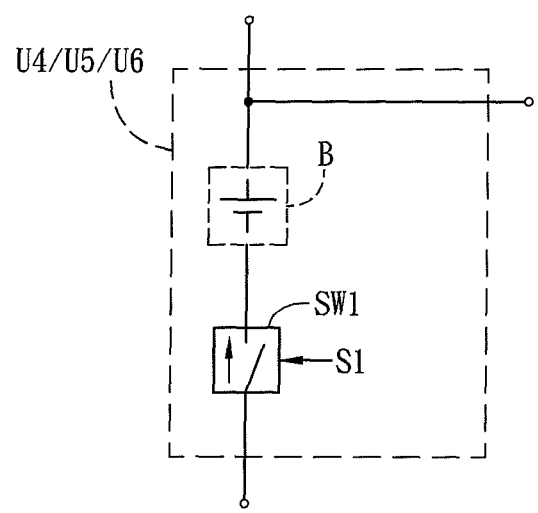

FIG. 10A is a schematic illustration showing a power management system 4 according to a preferred embodiment of the invention. As shown in FIG. 10A in conjunction with the schematic illustrations of the power units of FIGS. 10B and 10C, the power management system 4 is modified based on the power management system 1 and includes a plurality of power units U1 to U6, at least a first diode D1, at least a second diode D2, a control unit 12, a first polarity switch unit P and a second polarity switch unit Q. In this embodiment, the power management system 4 includes three first diodes D1 and three second diodes D2; however, in other embodiments, the power management system may include one, two or more first diodes D1 and one, two or more second diodes D2. Of course, the numbers of the first diodes D1 and the second diodes D2 can be different. For example, the power management system may include two first diodes D1 and one second diodes D2, and in this invention it is not limited.

The power units U1 to U6 are electrically connected to form a power unit string, and are divided into a first group C1 and a second group C2. The first group C1 includes the power units U1 to U3, while the second group C2 includes the power units U4 to U6. Each of the power units U1 to U6 includes a battery module B and a first switch device SW1. The battery module B and the first switch device SW1 are serially connected to form a serial module.

One end of the first diode D1 is electrically connected to one of the power units U1 to U3 of the first group C1, and the other end thereof is connected to a first common node. In more detailed, the cathodes of the first diodes D1 are electrically connected to each other and then connected to the first common node to form a first discharge path.

One end of the second diode D2 is electrically connected to one of the power units U4 to U6 of the second group C2, and the other end thereof is connected to a second common node. In more detailed, the anodes of the second diodes D2 are electrically connected to each other and then connected to the second common node to form a second discharge path.

The control unit 12 is electrically connected to the first switch devices SW1, individually outputs a first switch signal S1 to each first switch device SW1 in accordance with a control signal Sc, and individually controls each first switch device SW1 to turn on or off to control the discharge voltages on the first common node and the second common node.

The first polarity switch unit P is electrically connected to the power unit string, the first common node and the control unit 12, and outputs a first operating voltage V1. The control unit 12 outputs a first adjusting signal Sp1 to the first polarity switch unit P to control the polarity of the first operating voltage V1 and to make the first operating voltage V1 become an AC voltage.

The second polarity switch unit Q is electrically connected to the power unit string, the second common node and the control unit 12, and outputs a second operating voltage V2. The control unit 12 outputs a second adjusting signal Sp2 to the second polarity switch unit Q to control the polarity of the second operating voltage V2 so that the second operating voltage V2 becomes an AC voltage.

The working principle of the power management system 4 is similar to that of the power management system 1 except that the power management system 4 has dual outputs and can be regarded as cascading a power management system 1 and a power management system 3, so as to provide the first operating voltage V1 and the second operating voltage V2 concurrently and independently without mutual influence. So, the working principle thereof may be referred to those of the power management system 1 and the power management system 3.

In addition, various modified aspects of the power units may be applied to the power units U1 to U6, and the associated working principles are also the same as those mentioned hereinabove. So, detailed descriptions thereof are omitted.

Figure 11A:
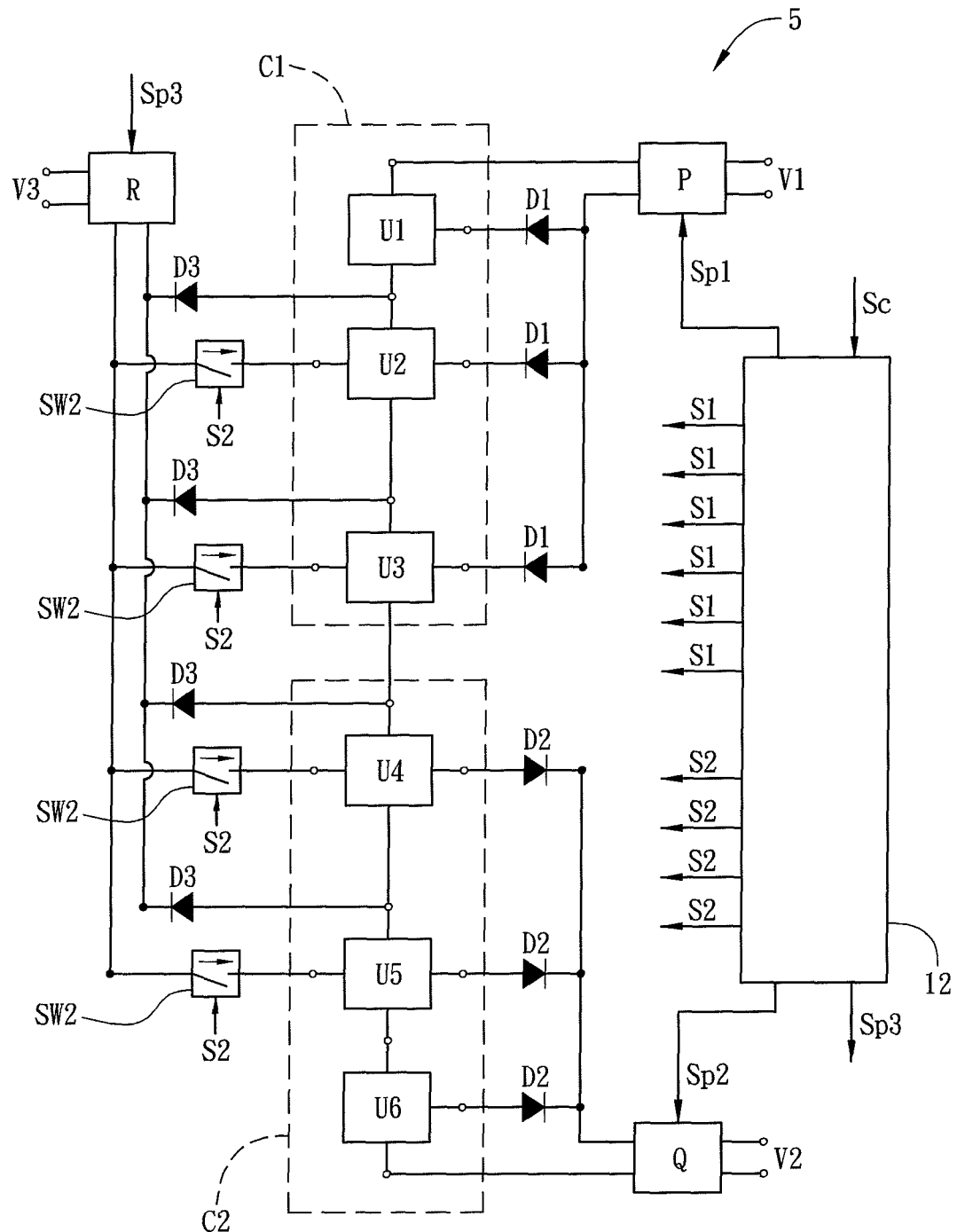
FIG. 11A is a schematic illustration showing a power management system according to a preferred embodiment of the invention.

FIG. 11A is a schematic illustration showing a power management system 5 according to a preferred embodiment of the invention. As shown in FIG. 11A, the power management system 5 is substantially the same as the power management system 4 except that the power management system 5 further includes at least a third diode D3, at least a second switch devices SW2, and a third polarity switch unit R. In this embodiment, the power management system 5 includes four third diodes D3 and four second switch devices SW2; however, in other embodiments, the power management system may include one, two or more third diodes D3 and one, two or more second switch devices SW2, and in this invention it is not limited.

One end of each third diode D3 is electrically connected to one of the power units U1 to U6, and the other end thereof is connected to a third common node.

One end of each second switch device SW2 is electrically connected to one of the power units U1 to U6, and the other end thereof is connected to a fourth common node. Each second switch device SW2 is electrically connected to the control unit 12.

The third polarity switch unit R is electrically connected to the third common node, the fourth common node and the control unit 12, and outputs a third operating voltage V3.

The control unit 12 outputs a second switch signal S2 to the second switch device SW2 in accordance with a control signal Sc to control the second switch device SW2 to turn on or off and to control the voltage between the third common node and the fourth common node. The third polarity switch unit R controls the polarity of the third operating voltage V3 in accordance with a third adjusting signal Sp3 outputted from the control unit 12.

Figure 11B:
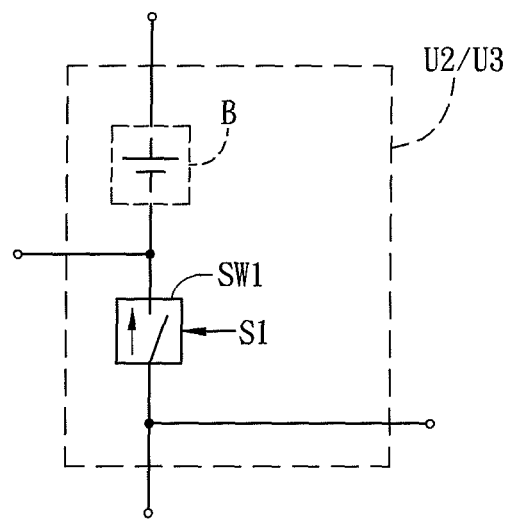
FIGS. 11B to 11G are schematic illustrations showing different power units.
Figure 11C:
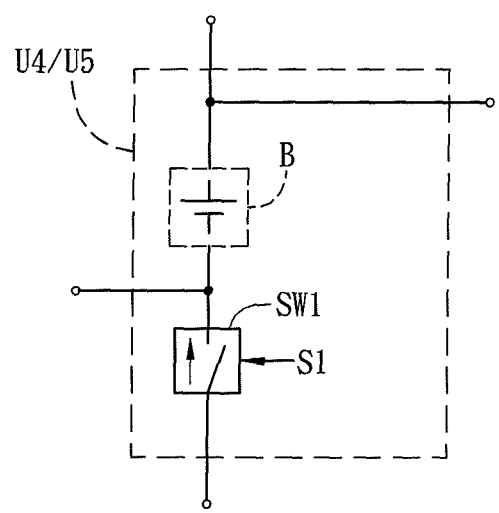

In addition, as shown in FIGS. 11B and 11C, compared with the power management system 4, a current path is present between the battery module B and the first switch device SW1 of each of the power units U2 to U5 of the power management system 5, and is to be coupled to the third polarity switch unit R. However, its circuit structure and working principle are still the same as those mentioned hereinabove.

For the sake of illustration, the power units from top to bottom are defined as the first to sixth stages of power units U1 to U6 in this embodiment. The control methods of the first operating voltage V1 and the second operating voltage V2 may be referred to those for the power management system 1 and the power management system 3. When the third operating voltage V3 needs to output the voltage of one battery module B, the control unit 12 can turn on the second switch device SW2 corresponding to the second-stage power unit U2, and turn off the second switch devices SW2 corresponding to the third-stage, fourth-stage and fifth-stage power units U3, U4, U5, so that the second-stage power unit U2 is discharged to the third polarity switch unit R to obtain the required voltage. When the third operating voltage V3 needs to output the voltages of two battery modules B, the control unit 12 can turn on the second switch devices SW2 corresponding to the second-stage and the third-stage power units U2, U3, and turn off the second switch devices SW2 corresponding to the fourth-stage and fifth-stage power units U4, U5, so that the second-stage and third-stage power units U2, U3 are discharged to the third polarity switch unit R, and the required voltage is obtained, and so on.

Therefore, the first switch signal S1 and the second switch signal S2 outputted from the control unit 12 can be utilized to control ON/OFF combinations of the switch devices, and the polarity of the output voltage of each polarity switch unit can be correspondingly controlled, so that the power management system 5 outputs the first operating voltage V1, the second operating voltage V2 and the third operating voltage V3, wherein the phase differences between the voltages V1, V2 and V3 may be 120 degrees. That is, the power management system 5 can provide a three-phase AC power output.

It is to be particularly noted that various modified aspects of the power units may be applied to the power units U1 to U6, and the associated working principles are also the same as those mentioned hereinabove. In the following, the working principle of this embodiment will be further described by taking the power units U1a to U6a, shown in FIGS. 11D to 11G, as examples.

Figure 11D:
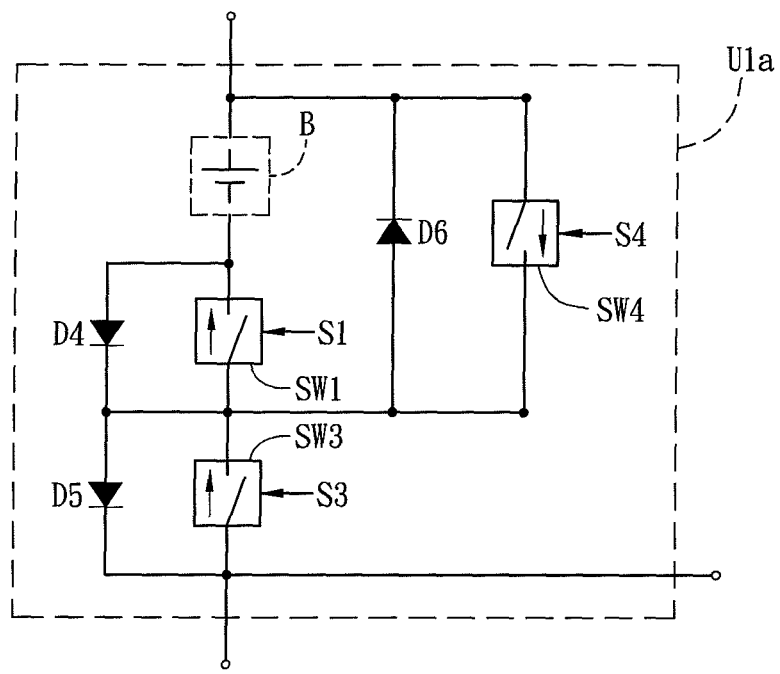
Figure 11E:
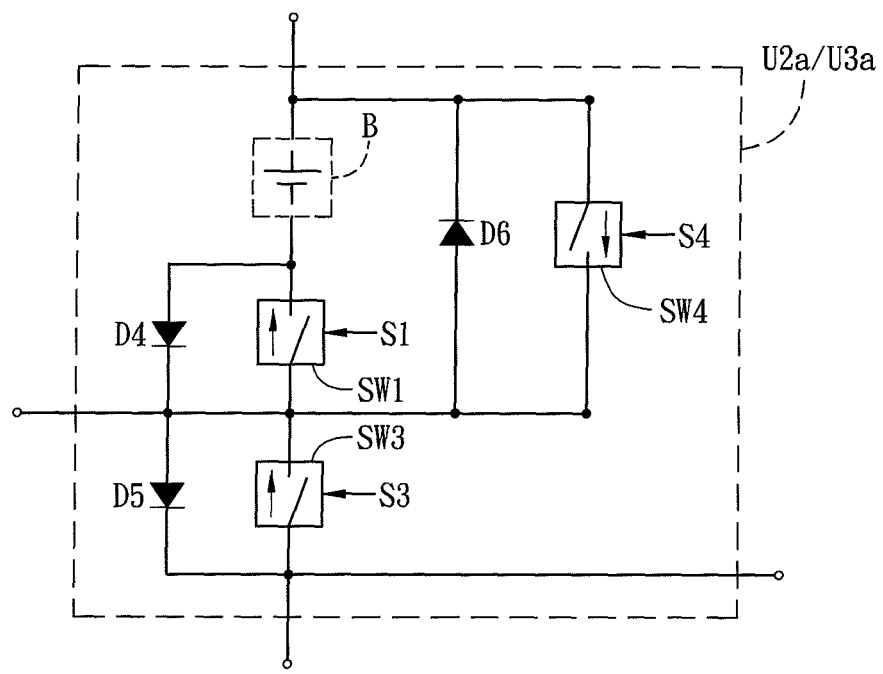
Figure 11F:
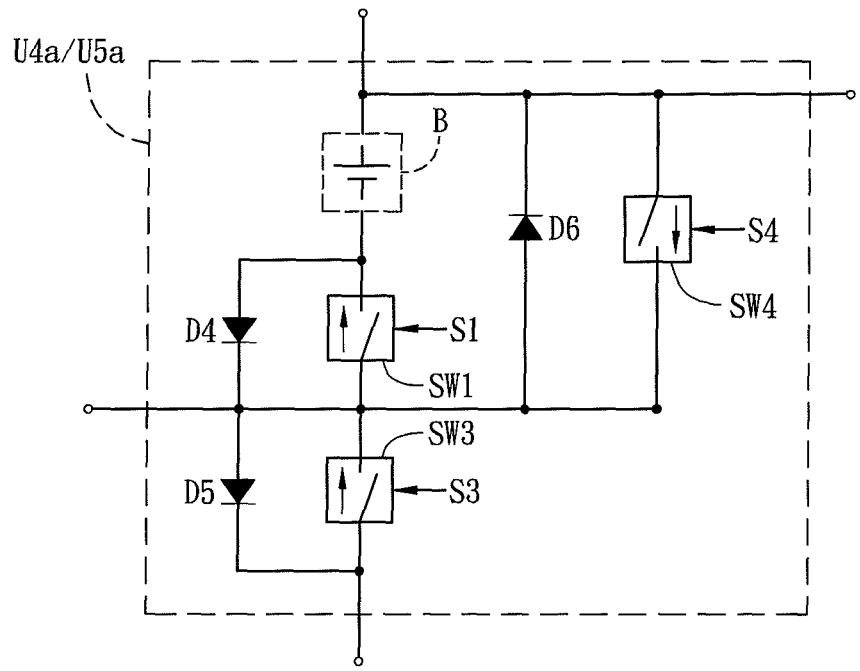
Figure 11G:
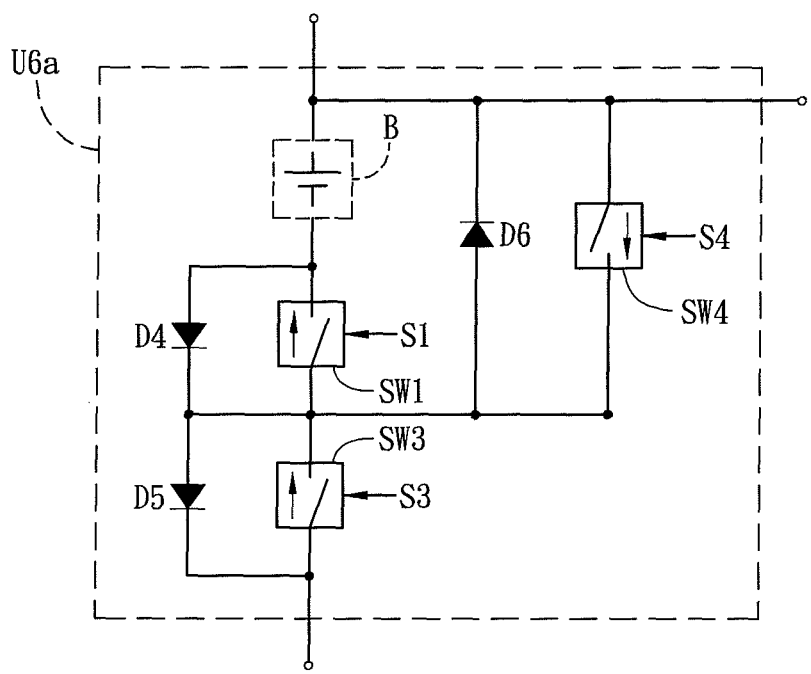

Please refer to FIG. 11A in view of FIGS. 11D to 11G, wherein FIG. 11D is a schematic illustration showing a modified power unit U1a of the power unit U1, FIG. 11E is a schematic illustration showing a modified power unit U2a or U3a of the power unit U2 or U3, FIG. 11F is a schematic illustration showing a modified power unit U4a or U5a of the power unit U4 or U5, and FIG. 11G is a schematic illustration showing a modified power unit U6a of the power unit U6.

The difference between the power units U1a to U6a and the power units U1 to U6 is that the power units U1a to U6a further include a fourth diode D4, a fifth diode D5, a sixth diode D6, a third switch device SW3 and a fourth switch device SW4.

Figures 12B, 12C:
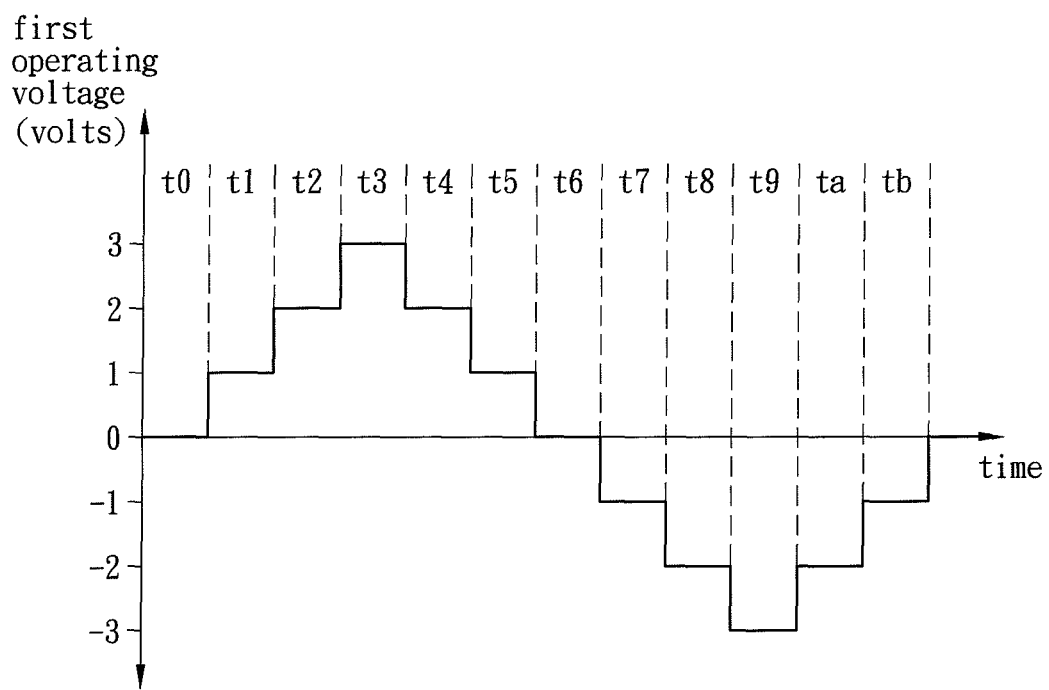
FIG. 12B is a schematic illustration showing voltage values of the operating voltages.
FIGS. 12C to 12E are schematic illustrations showing waveforms of the operating voltages.
Figure 12D:
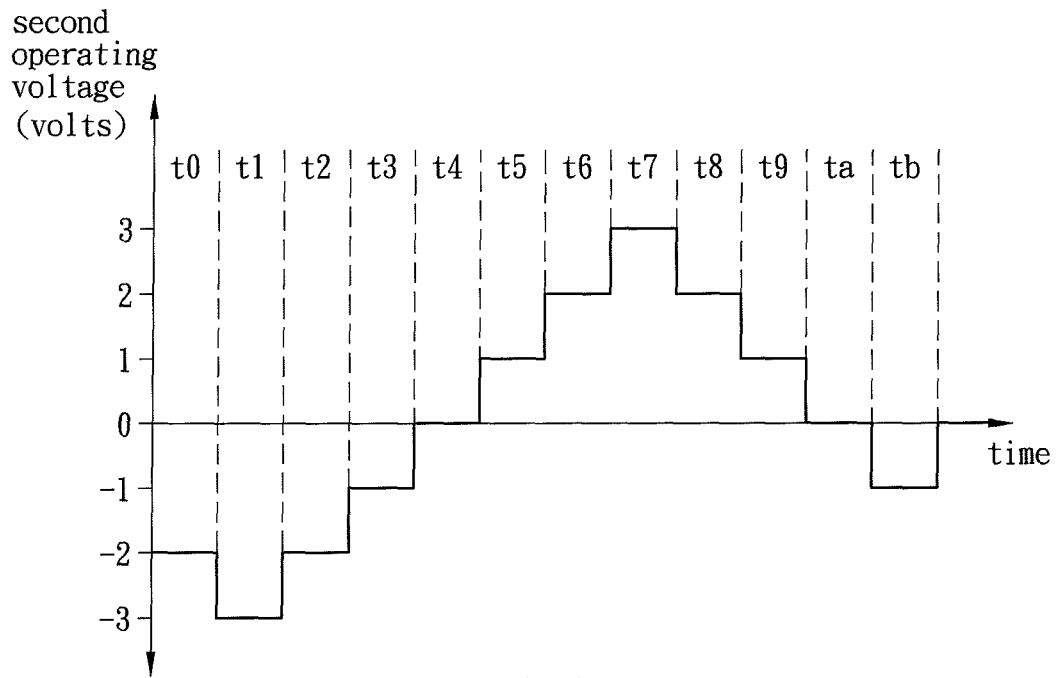
Figure 12E:
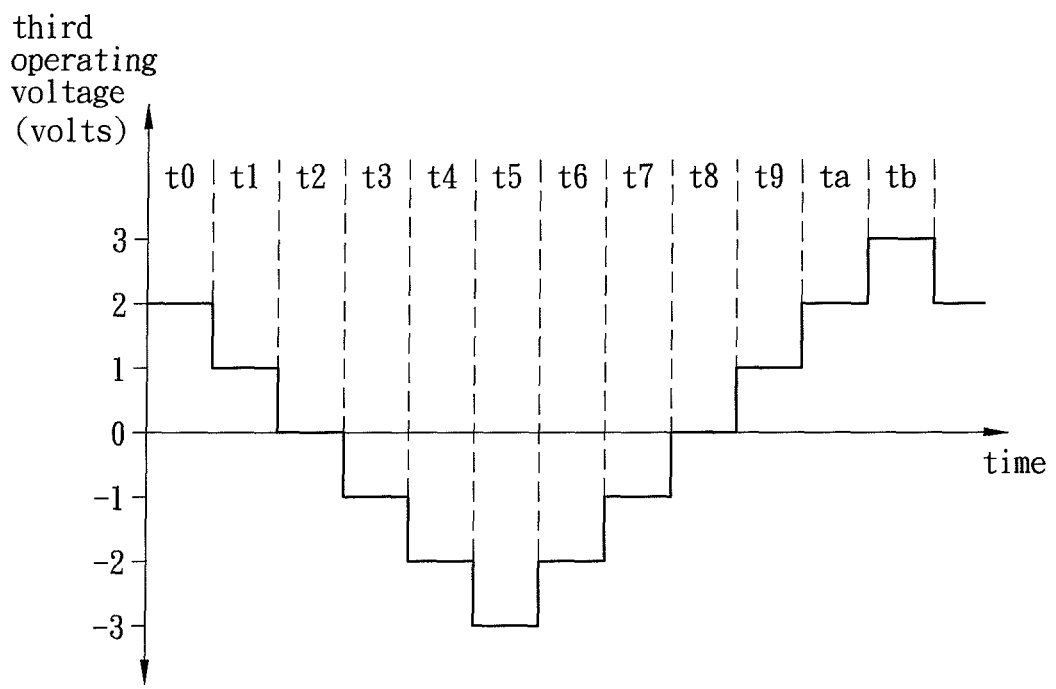

Please also refer to FIGS. 12A to 12E concurrently, wherein FIG. 12A is a schematic illustration showing various state combinations of the power management system 5 in conjunction with the switch devices of the power units U1a to U6a (the non-shown fourth switch device SW4 is turned off), FIG. 12B shows the voltage values of the operating voltages of the power management system 5 corresponding to the various state combinations of the switch devices listed in FIG. 12A, and FIGS. 12C to 12E are schematic illustrations showing output waveforms of the operating voltages V1 to V3, respectively.

Therefore, the first switch signal S1, the second switch signal S2, the third switch signal S3 and the fourth switch signal S4 outputted from the control unit 12 can be utilized to control the ON/OFF combinations of the switch devices, and the polarity of the output voltage of each polarity switch unit can be correspondingly controlled, so that the power management system 5 outputs the first operating voltage V1, the second operating voltage V2 and the third operating voltage V3, wherein the phase differences between the voltages V1, V2 and V3 may be 120 degrees. That is, the power management system 5 can provide a three-phase AC power output.

Figure 13:
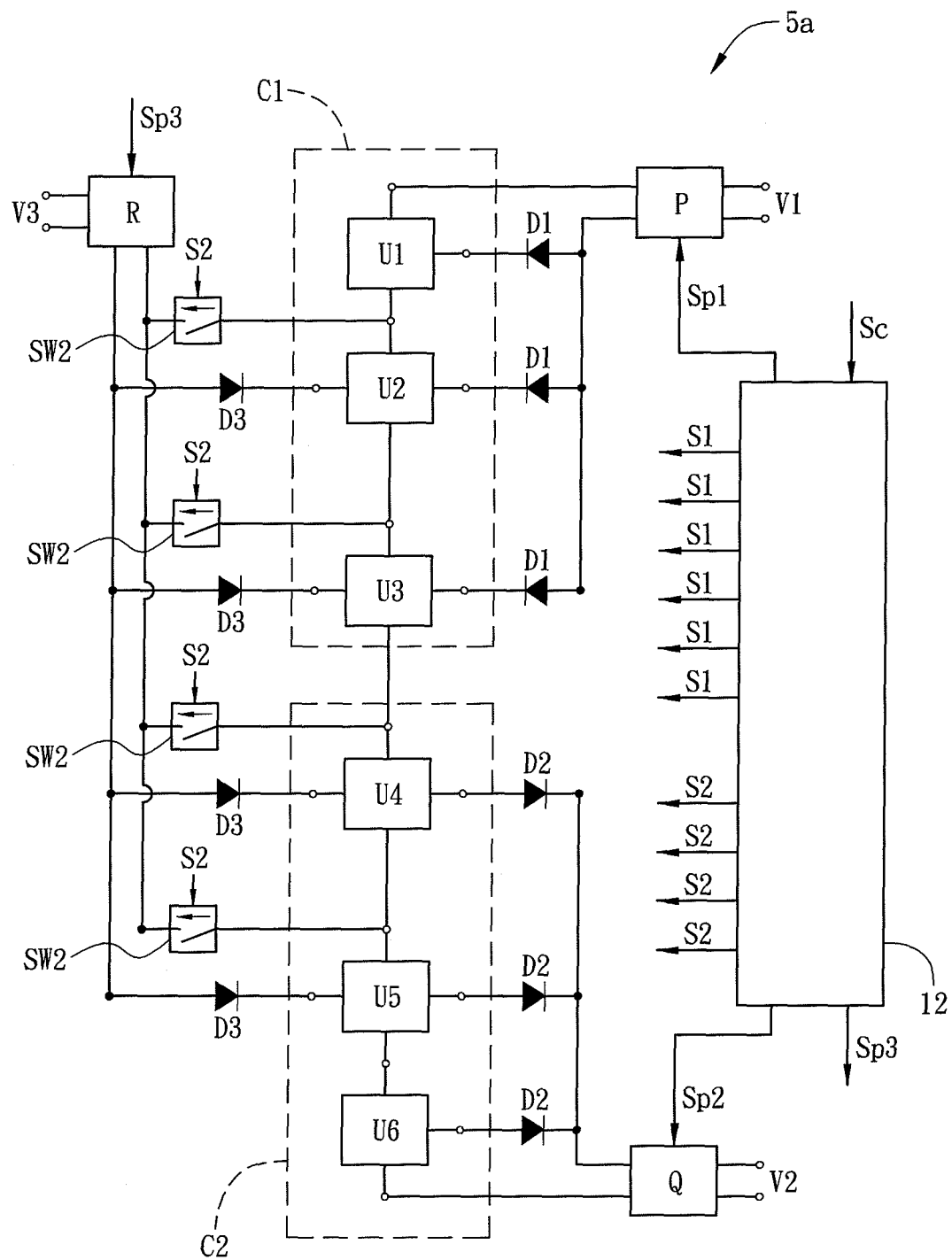
FIG. 13 is a schematic illustration showing a power management system according to a preferred embodiment of the invention.

FIG. 13 is a schematic illustration showing a power management system 5a according to a preferred embodiment of the invention. As shown in FIG. 13, the power management system 5a is substantially the same as the power management system 5 except that the connection positions of the second switch device SW2 and the third diode D3 are exchanged, and their connected are reversed. However, the overall working principle of the power management system 5a is still the same as that of the power management system 5.

In addition, it is to be noted that although six power units serve as examples to be described in this embodiment, other numbers of power units may also be utilized in practice, and the invention is not restricted thereto.

Figure 14A:
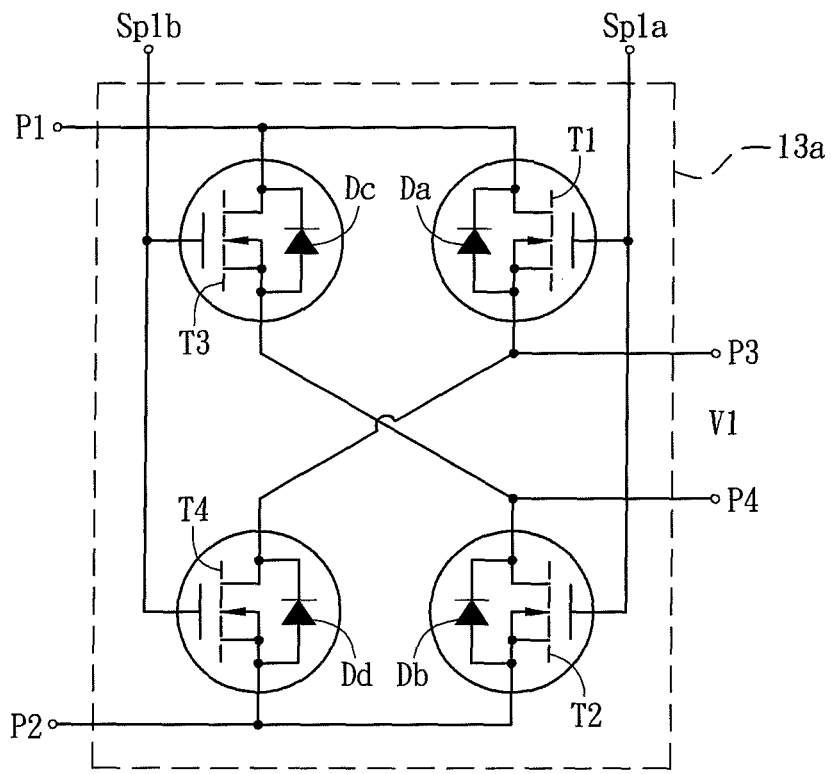
FIGS. 14A to 14C are schematic illustrations showing different first polarity switch units.

FIG. 14A is a schematic illustration showing a first polarity switch unit 13a. Of course, this aspect may also be applied to the first polarity switch unit P, the second polarity switch units 17, 18, Q or the third polarity switch unit R. The first polarity switch unit 13a includes a first transistor T1, a second transistor T2, a third transistor T3, a fourth transistor T4, a first rectifying diode Da, a second rectifying diode Db, a third rectifying diode Dc, a fourth rectifying diode Dd, a first control end Sp1a and a second control end Sp1b. When the first control end Sp1a has the high potential and the second control end Sp1b has the low potential, the first transistor T1 and the second transistor T2 turn on, and the current flows from the node P1 to the node P2 through the first transistor T1, the node P3, the load (not shown), the node P4 and the second transistor T2. When the first control end Sp1a has the low potential and the second control end Sp1b has the high potential, the third transistor T3 and the fourth transistor T4 turn on, and the current flows from the node P1 to the node P2 through the third transistor T3, the node P4, the load, the node P3 and the second transistor T2.

Figure 14B:
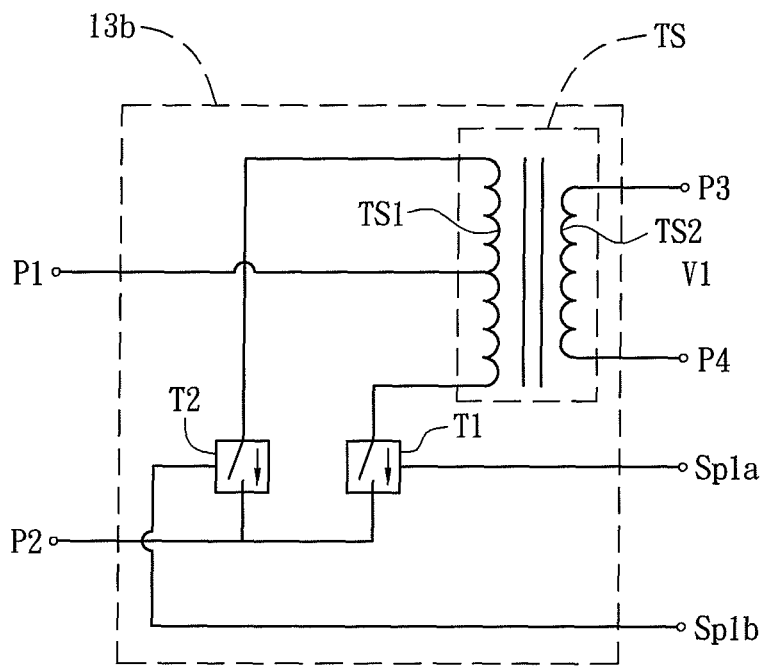

FIG. 14B is a schematic illustration showing a first polarity switch unit 13b. The polarity switch unit 13b includes a first DC end (node P1), a second DC end (node P2), two AC ends (nodes P3 and P4), a first control end Sp1a, a second control end Sp1b, a transformer TS, a first transistor T1 and a second transistor T2. The transformer TS has a primary coil TS1 and a secondary coil TS2. The primary coil TS1 has a first primary end, a second primary end and a middle tapped end, which is connected to the first DC end (node P1), wherein the two ends of the secondary coil TS2 are connected to the two AC ends (nodes P3 and P4), respectively. The first transistor T1 is electrically connected to the first primary end, the second DC end (node P2) and the first control end Sp1a to provide an unidirectional current path between the first primary end and the second DC end (node P2), and is controlled by the first control end Sp1a to turn on and off. The second transistor T2 is electrically connected to the second primary end, the second DC end (node P2) and the second control end Sp1b to provide a unidirectional current path between the second primary end and the second DC end (node P2), and is controlled by the second control end Sp1b to turn on and off.

The primary coil TS1, the first DC end (node P1) and the second DC end (node P2) can receive the discharge voltage of the power unit string, wherein the discharge voltage may be a voltage fluctuating from the peak value to the zero or lowest value at a specific frequency. The first transistor T1 and the second transistor T2 alternately turn on and off when the discharge voltage approaches zero or the lowest value to switch the output polarity and output the AC power to the secondary coil TS2 and the two AC ends (nodes P3 and P4).

Figure 14C:
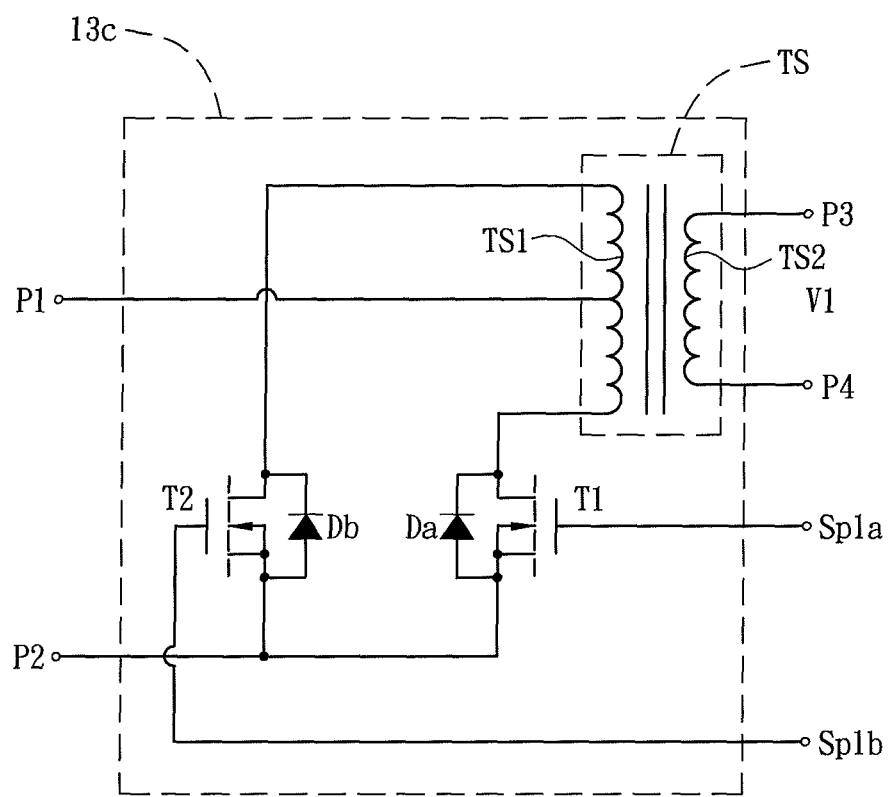

FIG. 14C is a schematic illustration showing a first polarity switch unit 13c. Compared with the first polarity switch unit 13b, the first polarity switch unit 13c further includes a first rectifying diode Da and a second rectifying diode Db. The first rectifying diode Da and the first transistor T1 are connected in parallel to provide a reverse current path. The second rectifying diode Db and the second transistor T2 are connected in parallel to provide a reverse current path.

When the first transistor T1 and the second transistor T2 turn off, the two AC ends (nodes P3 and P4) and the secondary coil TS2 can receive an AC power input. The primary coil TS1, the first rectifying diode Da and the second rectifying diode Db rectify the AC power input into a DC voltage, which is outputted from the first DC end (node P1) and the second DC end (node P2) to charge each power unit.

It is to be particularly noted that the technological characteristics of the above-mentioned various modified aspects based on the power management system 2 can be applied to the power management system 3 except that the first common nodes of the first diodes D1 are different, so detailed descriptions thereof are omitted. However, it is still deemed as falling within the scope of the invention.

In summary, the power management system in accordance with the invention utilizes the control unit to output a first switch signal to the first switch device to control the first switch device to turn on or off, and to control the first polarity switch unit to adjust the polarity of the first operating voltage, thereby making the first operating voltage become an AC voltage. In addition, the connection to an additional switch device or diode makes the power management system not only provide the discharge function, but also provide the charge function, the protection for power units, or the multiphase output, thereby minimizing the power loss, and adjusting the connection configuration of the power units in accordance with the charge voltage, the voltage output requirement or the state of each battery module.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power management system, comprising:
    a plurality of power units serially connected to form a power unit string, wherein each of the power units comprises a battery module and a first switch device, the battery module and the first switch device are serially connected to form a serial module;
    at least a first diode having one end electrically connected to one of the power units and the other end electrically connected to a first common node to form a discharge path;
    a control unit electrically connected to the first switch devices for outputting a first switch signal to each of the first switch devices in accordance with a control signal individually, and controlling each of the first switch devices to turn on or off individually so as to control a discharge voltage on the first common node; and
    a first polarity switch unit electrically connected to the power unit string, the first common node and the control unit and outputting a first operating voltage, wherein the control unit outputs a first adjusting signal to the first polarity switch unit to control a polarity of the first operating voltage,
    wherein each of the power units further comprises a second diode, which is connected in parallel to the serial module to form a parallel circuit, and the second diode provides a discharge bypass path for other power units to discharge.

2. The power management system according to claim 1, wherein each of the power units further comprises:
    a second switch device serially connected to the serial module, wherein the second switch device is electrically connected to the control unit, and turns on or off in accordance with a second switch signal outputted from the control unit.

3. The power management system according to claim 1, further comprising:
    at least a second switch device connected in parallel to the first diode to provide a charge current path, wherein the second switch device is electrically connected to the control unit and turns on or off in accordance with a second switch signal outputted from the control unit.

4. The power management system according to claim 1, further comprising:
    at least a second diode having one end electrically connected to one of the power units and the other end connected to a second common node; and
    a second polarity switch unit electrically connected to the power unit string, the second common node, and the control unit, and outputting a second operating voltage, wherein the second polarity switch unit controls a polarity of the second operating voltage in accordance with a second adjusting signal outputted from the control unit.

5. The power management system according to claim 2, further comprising:

at least a third diode having one end electrically connected to one of the power units and the other end connected to a second common node;

a second polarity switch unit electrically connected to the power unit string, the second common node, and the control unit, and outputting a second operating voltage, wherein the second polarity switch unit controls a polarity of the second operating voltage in accordance with a second adjusting signal outputted from the control unit.

6. The power management system according to claim 1, further comprising:

a current controller electrically connected to the first polarity switch unit and the power unit string to provide the charge path; and a rectifying unit connected in parallel to the first polarity switch unit to provide the charge path.

7. The power management system according to claim 4, further comprising:

at least a third diode having one end electrically connected to one of the power units and the other end connected to a third common node;

at least a second switch device having one end electrically connected to one of the power units and the other end connected to a fourth common node, wherein the second switch device turns on or off in accordance with a second switch signal outputted from the control unit; and a third polarity switch unit electrically connected to the third common node, the fourth common node and the control unit, and outputting a third operating voltage, wherein the third polarity switch unit controls a polarity of the third operating voltage in accordance with a third adjusting signal outputted from the control unit.

8. The power management system according to claim 1, further comprising:

at least a second switch device serially connected to the first diode and electrically connected to the control unit, wherein the second switch device turns on or off in accordance with a second switch signal outputted from the control unit.

9. The power management system according to claim 8, further comprising:

at least a third switch device electrically connected to one of the power units and the control unit, wherein the third switch device turns on or off in accordance with a third switch signal outputted from the control unit;

at least a third diode serially connected to one of the third switch devices and electrically connected to at least one second common node to provide at least one discharge current path; and at least a second polarity switch unit electrically connected to the power unit string, one of the second common nodes, and the control unit, and outputting at least a second operating voltage, wherein the second polarity switch unit controls a polarity of the second operating voltage in accordance with a second adjusting signal outputted from the control unit.

10. The power management system according to claim 1, wherein the control signal is a signal representing a capacity of each of the battery modules, representing a voltage value on the first common node, or representing the first operating voltage.

11. The power management system according to claim 1, wherein a capacity of each of the battery modules is directly proportional to a discharge duty cycle thereof.

12. The power management system according to claim 1, wherein the first polarity switch unit comprises:

a first DC end, a second DC end, two AC ends, a first control end and a second control end;

a transformer having a primary coil and a secondary coil, wherein the primary coil has a first primary end, a second primary end and a middle tapped end, the middle tapped end is connected to the first DC end, and two ends of the secondary coil are respectively connected to the two AC ends;

a first transistor, which is electrically connected to the first primary end, the second DC end and the first control end to provide a unidirectional current path between the first primary end and the second DC end, and is controlled by the first control end to turn on and off;

a second transistor, which is electrically connected to the second primary end, the second DC end and the second control end to provide a unidirectional current path between the second primary end and the second DC end, and is controlled by the second control end to turn on and off;

a first rectifying diode, which is connected in parallel to the first transistor to provide a reverse current path; and a second rectifying diode, which is connected in parallel to the second transistor to provide a reverse current path, wherein the primary coil, the first DC end and the second DC end receive a DC voltage with a voltage fluctuating between a peak value voltage thereof and a lowest voltage thereof at a specific frequency; the first transistor and the second transistor alternately turn on and off when the DC voltage approximates or equals its lowest voltage to switch a current direction of the primary coil to output an AC power with a frequency equal to one half of the specific frequency at the secondary coil and the two AC ends; and when the first transistor and the second transistor turn off, the two AC ends receive an AC power input, which is rectified into a DC voltage by the primary coil, the first rectifying diode and the second rectifying diode, and the DC voltage is outputted from the first DC end and the second DC end.

13. A power management system, comprising:

a plurality of power units electrically connected to form a power unit string, wherein each of the power units comprises a battery module and a first switch device, and the battery module and the first switch device are serially connected to form a serial module;

at least a second switch device having one end electrically connected to one of the power units and the other end connected to a first common node to form a discharge path;

at least a third switch device having one end electrically connected to one of the power units and the other end connected to a second common node to form another discharge path;

a first polarity switch unit electrically connected to the power unit string and the first common node, and outputting a first operating voltage;

a second polarity switch unit electrically connected to the power unit string and the second common node, and outputting a second operating voltage; and a control unit electrically connected to the first switch devices, the second switch devices, the third switch devices, the first polarity switch unit, and the second polarity switch unit, wherein the control unit individually outputs a first switch signal to each of the first switch devices in accordance with a control signal, and individually controls each of the first switch devices to turn on or off; the control unit individually outputs a second switch signal to each of the second switch devices in accordance with the control signal, and individually controls each of the second switch devices to turn on or off to control a discharge voltage on the first common node; the control unit individually outputs a third switch signal to each of the third switch devices in accordance with the control signal, and individually controls each of the third switch devices to turn on or off to control a discharge voltage on the second common node; the control unit outputs a first adjusting signal to the first polarity switch unit to control a polarity of the first operating voltage; and the control unit outputs a second adjusting signal to the second polarity switch unit to control a polarity of the second operating voltage, wherein each of the power units further comprises a diode, which is connected in parallel to the serial module to form a parallel circuit, and the diode provides a discharge bypass path for other power units to discharge.

14. The power management system according to claim 13, wherein the first polarity switch unit or the second polarity switch unit comprises:

a first DC end, a second DC end, two AC ends, a first control end and a second control end;

a transformer having a primary coil and a secondary coil, wherein the primary coil has a first primary end, a second primary end and a middle tapped end, the middle tapped end is connected to the first DC end, and two ends of the secondary coil are respectively connected to the two AC ends;

a first transistor, which is electrically connected to the first primary end, the second DC end and the first control end to provide a unidirectional current path between the first primary end and the second DC end, and is controlled by the first control end to turn on and off;

a second transistor, which is electrically connected to the second primary end, the second DC end and the second control end to provide a unidirectional current path between the second primary end and the second DC end, and is controlled by the second control end to turn on and off;

a first rectifying diode, which is connected in parallel to the first transistor to provide a reverse current path; and a second rectifying diode, which is connected in parallel to the second transistor to provide a reverse current path, wherein the primary coil, the first DC end and the second DC end receive a DC voltage with a voltage fluctuating between a peak value voltage thereof and a lowest voltage thereof at a specific frequency; the first transistor and the second transistor alternately turn on and off when the DC voltage approximates or equals its lowest voltage to switch a current direction of the primary coil to output an AC power with a frequency equal to one half of the specific frequency at the secondary coil and the two AC ends; and when the first transistor and the second transistor turn off, the two AC ends receive an AC power input, which is rectified into a DC voltage by the primary coil, the first rectifying diode and the second rectifying diode, and the DC voltage is outputted from the first DC end and the second DC end.

* * * * *